US008825867B2

(12) United States Patent
Arisoylu et al.

(10) Patent No.: US 8,825,867 B2
(45) Date of Patent: Sep. 2, 2014

(54) TWO LEVEL PACKET DISTRIBUTION WITH STATELESS FIRST LEVEL PACKET DISTRIBUTION TO A GROUP OF SERVERS AND STATEFUL SECOND LEVEL PACKET DISTRIBUTION TO A SERVER WITHIN THE GROUP

(75) Inventors: Mustafa Arisoylu, San Jose, CA (US);
Abhishek Arora, Stanford, CA (US);
Prashant Anand, Bangalore (IN)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 89 days.

(21) Appl. No.: 13/464,608

(22) Filed: May 4, 2012

(65) Prior Publication Data
US 2013/0297798 A1 Nov. 7, 2013

(51) Int. Cl.
G06F 15/16 (2006.01)
H04L 29/08 (2006.01)

(52) U.S. Cl.
CPC ......... *H04L 67/1014* (2013.01); *H04L 67/1006* (2013.01); *H04L 67/1023* (2013.01); *H04L 67/1027* (2013.01)
USPC ............................ 709/226; 709/231; 370/254

(58) Field of Classification Search
CPC ............. H04L 67/1002; H04L 67/1006; H04L 67/1023; H04L 67/1027; H04L 67/1014; H04L 67/1029
USPC ......... 709/200–203, 217–227, 228, 231–232, 709/239, 249; 370/254
See application file for complete search history.

(56) References Cited

U.S. PATENT DOCUMENTS

| 6,944,678 | B2 * | 9/2005 | Lu et al. ........................ | 709/245 |
|---|---|---|---|---|
| 7,321,926 | B1 | 1/2008 | Zhang et al. | |
| 7,647,424 | B2 * | 1/2010 | Kim et al. ..................... | 709/238 |
| 7,653,700 | B1 * | 1/2010 | Bahl et al. ..................... | 709/217 |
| 7,822,871 | B2 * | 10/2010 | Stolorz et al. ................ | 709/238 |
| 7,908,605 | B1 * | 3/2011 | Graupner et al. ............. | 718/104 |
| 2002/0194342 | A1 * | 12/2002 | Lu et al. ........................ | 709/227 |
| 2002/0194345 | A1 * | 12/2002 | Lu et al. ........................ | 709/227 |

(Continued)

OTHER PUBLICATIONS

Tatsuya Mori, et al., "Identifying Elephant Flows Through Periodically Sampled Packets", In Proceedings of the 4th ACM SIGCOMM conference on Internet measurement (IMC '04), 2004, ACM New York, NY, USA, 115-120. DOI=10.1145/1028788.1028803, http://doi.acm.org/10.1145/1028788.1028803.

(Continued)

*Primary Examiner* — Moustafa M Meky
(74) *Attorney, Agent, or Firm* — Blakely Sokoloff Taylor & Zafman LLP

(57) ABSTRACT

A method, in one or more network elements that are in communication between clients that transmit packets and servers, of distributing the packets among the servers which are to process the packets. Stickiness of flows to servers assigned to process them is provided. A packet of a flow is received at a static first level packet distribution module. A group of servers is statically selected for the packet of the flow with the first level module. State that assigns the packet of the flow to the selected group of servers is not used. The packet of the flow is distributed to a distributed stateful second level packet distribution system. A server of the selected group is statefully selected with the second level system by accessing state that assigns processing of packets of the flow to the selected server. The packet of the flow is distributed to the selected server.

23 Claims, 13 Drawing Sheets

(56) References Cited

U.S. PATENT DOCUMENTS

| | | | |
|---|---|---|---|
| 2002/0194350 A1* | 12/2002 | Lu et al. | 709/229 |
| 2003/0065762 A1* | 4/2003 | Stolorz et al. | 709/223 |
| 2006/0233106 A1 | 10/2006 | Achlioptas et al. | |
| 2006/0288119 A1* | 12/2006 | Kim et al. | 709/238 |
| 2011/0145386 A1* | 6/2011 | Stolorz et al. | 709/223 |
| 2011/0185065 A1 | 7/2011 | Stanusic et al. | |
| 2011/0191477 A1* | 8/2011 | Zhang et al. | 709/226 |

OTHER PUBLICATIONS

S. Ben Fredj, et al., "Statistical Bandwidth Sharing: A Study of Congestion at Flow Level", In Proceedings of ACM SIGCOMM, pp. 111-122, Aug. 2001.

T. Mori, et al., "On the Characteristics of Internet Traffic Variability: Spikes and Elephants", In Proceedings of IEEE/IPSJ Saint, pp. 99-106, Tokyo, Japan Jan. 2004.

K. Papagiannaki et al., "On the Feasibility of Identifying Elephants in Internet Backbone Traffic Sprint ATL Technical Report TR01-ATL-110918", Sprint Labs, Nov. 2001. 13 Pages.

K. Thompson, et al., "Wide-Area Internet Traffic Patterns and Characteristics", IEEE Network, vol. 11, No. 6, pp. 10-23, Nov./Dec. 1997.

Yi Lu, et al., "Elephanttrap: A Low Cost Device for Identifying Large Flows", High-Performance Interconnects, Symposium on pp. 99-108, 15th Annual IEEE Symposium on High Performance Interconnects (HOTI 2007) 2007.

* cited by examiner

TWO LEVEL PACKET DISTRIBUTION WITH STATELESS FIRST LEVEL PACKET DISTRIBUTION TO A GROUP OF SERVERS AND STATEFUL SECOND LEVEL PACKET DISTRIBUTION TO A SERVER WITHIN THE GROUP

BACKGROUND

1. Field

Embodiments of the invention relate to the field of networking; and more specifically, to the distributing packets among servers in networking.

2. Background Information

There are numerous examples in networking where clients or service requesters communicate with servers or providers of services or resources over one or more networks. The clients typically request a resource or that a service be performed and the servers perform the service or provide the resource. Often a set of servers are provided in order to provide greater servicing capability, resiliency or high availability (e.g., in the event of a server failing or being taken offline), etc. As an example, a server farm may be used to provide services associated with web sites, Internet Relay Chat networks, high-bandwidth File Transfer Protocol sites, Network News Transfer Protocol (NNTP) servers, Domain Name System (DNS) servers, to name just a few examples.

Server load balancing is commonly used to distribute service requests from the clients among a set of servers in order to balance or more evenly distribute loads (e.g., processing loads or workloads) associated with handling the service requests among the set of servers. Server load balancing, within certain constraints, generally helps to prevent some of the servers from being over loaded while other servers are being underutilized. Such server load balancing generally offers advantages such as increased resource utilization, increased performance, increased throughput, reduced response time, reduced server overload, etc. In addition, server load balancing may also be used in conjunction with providing resiliency or high availability by redistributing loads when one of the servers fails, is taken offline, etc. Generally the server load balancing is transparent to the clients requesting the services.

Server load balancing algorithms are commonly used to determine which servers to distribute service requests or workloads to. The server load balancing algorithms commonly include scheduling algorithms as well as other algorithms. The algorithms used to implement server load balancing vary from relatively simple algorithms to relatively sophisticated algorithms. Examples of relatively simple algorithms include random choice algorithms and round robin algorithms. Examples of more sophisticated algorithms include those that take into account factors pertinent to load balancing such as the server's current load, a server's up/down status, etc. By way of example, a weighted round robin algorithm may be used and the weights for the servers may be changed dynamically based on the current workloads of the servers.

A common type of server load balancing is known as stateful server load balancing. In one known approach for stateful server load balancing, a first packet of a flow is detected at a server load balancer. For example, a SYN packet of a TCP connection may be detected by examining a header of the SYN packet. The server load balancer uses a server load balancing algorithm (e.g., a random choice algorithm or a round robin algorithm) to select or assign a server to handle the TCP connection. An entry including an identifier for the TCP connection and an identifier for the server assigned to handle the TCP connection is added as state to a state table maintained by the server load balancer. Subsequently, when additional packets of the TCP connection are received, the server load balancer performs a table lookup into the state table. The table lookup locates the entry that maps the TCP connection identifier to the server identifier. The server load balancer forwards the additional packets to the identified server. In such a stateful approach, state that is based on a previous load balancing decision (e.g., based on a previous calculation with a load balancing algorithm) is stored or preserved and is used to make subsequent load balancing decisions.

Such stateful server load balancing approaches tend to have certain drawbacks especially when the number of connections is high. As one example, when the number of connections is high, the size of the state table tends to become correspondingly large. As a result, the amount of memory to store the table generally increases. Also, the time and processing resources needed to perform table lookups generally also increase. Such table lookups may be performed for each packet received for each established connection. Moreover, the load balancing algorithm may be performed for each new connection. Consequently, especially when the number of connections is high, such approaches may potentially cause the sever load balancer to suffer from resource exhaustion from memory and/or processing resources. Alternatively, in an effort to avoid such resource exhaustion, the load balancers may be highly provisioned with hardware, which generally tends to make them correspondingly costly. Another potential drawback, if a redundant or backup server load balancer is provided (e.g., for resiliency or high availability), is that significant communication and processing overhead may be encountered in order to synchronize the state (e.g., state table) of the redundant or backup server load balancer.

SUMMARY

In one aspect, a method, which is performed in one or more network elements that are in communication between clients that transmit packets and servers, of distributing the packets among the servers which are to process the packets. Stickiness of flows of the packets to servers assigned to process the packets of the flows is provided. The method includes a step of receiving a packet of a flow at a static first level packet distribution module. The method also includes a step of statically selecting a group of servers, from among a plurality of groups of the servers, for the packet of the flow with the static first level packet distribution module. Statically selecting the group of servers does not involve using state that assigns the packet of the flow to the selected group of servers. The method further includes a step of distributing the packet of the flow to a distributed stateful second level packet distribution system. Also included is a step of statefully selecting a server of the selected group of servers that is to process the packet of the flow with the distributed stateful second level packet distribution system by accessing state that assigns processing of packets of the flow to the selected server. The method includes a step of distributing the packet of the flow to the selected server. Advantages that may be achieved depending on the implementation include the ability to efficiently handle large numbers of flows and/or the ability to handle a number of flows efficiently without excessive hardware provisioning, the ability to avoid using state in the first level of packet distribution, and the capability of dynamicity of servers without disrupting the stickiness of existing flows.

In another aspect, a multi-level packet distribution system configured to be deployed on one or more network elements in a network between clients that transmit packets and servers. The multi-level packet distribution system is operable to distribute the packets among the servers, while providing stickiness of flows of the packets to the servers. The multi-level packet distribution system includes a static first level packet distribution module configured to receive a packet of a flow. The static first level packet distribution module is operable to statically select a group of servers, from among a plurality of groups of the servers, for the packet of the flow. Statically selecting the group of servers does not involve using state that assigns the packet of the flow to the selected group of servers. The multi-level packet distribution system also includes a distributed stateful second level packet distribution system in communication with the static first level packet distribution module. The distributed stateful second level packet distribution system includes a plurality of distributed stateful second level packet distribution modules. The distributed stateful second level packet distribution system is operable to statefully select a server of the selected group of servers that is to process the packet of the flow. Statefully selecting the server involves using state that assigns the flow to the selected server. The distributed stateful second level packet distribution system is operable to distribute the packet to the selected server. Advantages that may be achieved depending on the implementation include the ability to efficiently handle large numbers of flows and/or the ability to handle a number of flows efficiently without excessive hardware provisioning, the ability to avoid using state in the first level of packet distribution, and the capability of dynamicity of servers without disrupting the stickiness of existing flows.

BRIEF DESCRIPTION OF THE DRAWINGS

The invention may best be understood by referring to the following description and accompanying drawings that are used to illustrate embodiments of the invention. In the drawings.

DESCRIPTION OF EMBODIMENTS

In the following description, numerous specific details, such as specific network configurations, algorithms, sequences of operations, data structures, partitioning/integration choices, and the like, are set forth. However, it is understood that embodiments of the invention may be practiced without these specific details. In other instances, well-known circuits, structures and techniques have not been shown in detail in order not to obscure the understanding of this description.

As used herein, a network element (e.g., a router, switch, bridge) is a piece of networking equipment, including hardware and software, that communicatively interconnects other equipment on the network (e.g., other network elements, end stations, etc.). Some network elements are "multiple services network elements" that provide support for multiple networking functions (e.g., routing, bridging, switching, Layer 2 aggregation, session border control, Quality of Service, and/or subscriber management), and/or provide support for multiple application services (e.g., data, voice, and video). Subscriber end stations (e.g., clients, workstations, laptops, netbooks, palm tops, mobile phones, smartphones, multimedia phones, Voice Over Internet Protocol (VOIP) phones, user equipment, terminals, portable media players, GPS units, gaming systems, set-top boxes) access content/services provided over the Internet and/or content/services provided on virtual private networks (VPNs) overlaid on (e.g., tunneled through) the Internet. The content and/or services are typically provided by one or more end stations (e.g., server end stations) belonging to a service or content provider or end stations participating in a peer to peer service, and may include, for example, public webpages (e.g., free content, store fronts, search services), private webpages (e.g., username/password accessed webpages providing email services), and/or corporate networks over VPNs. Typically, subscriber end stations are coupled (e.g., through customer premise equipment coupled to an access network (wired or wirelessly)) to edge network elements, which are coupled (e.g., through one or more core network elements) to other edge network elements, which are coupled to other end stations (e.g., server end stations).

Figure 1:
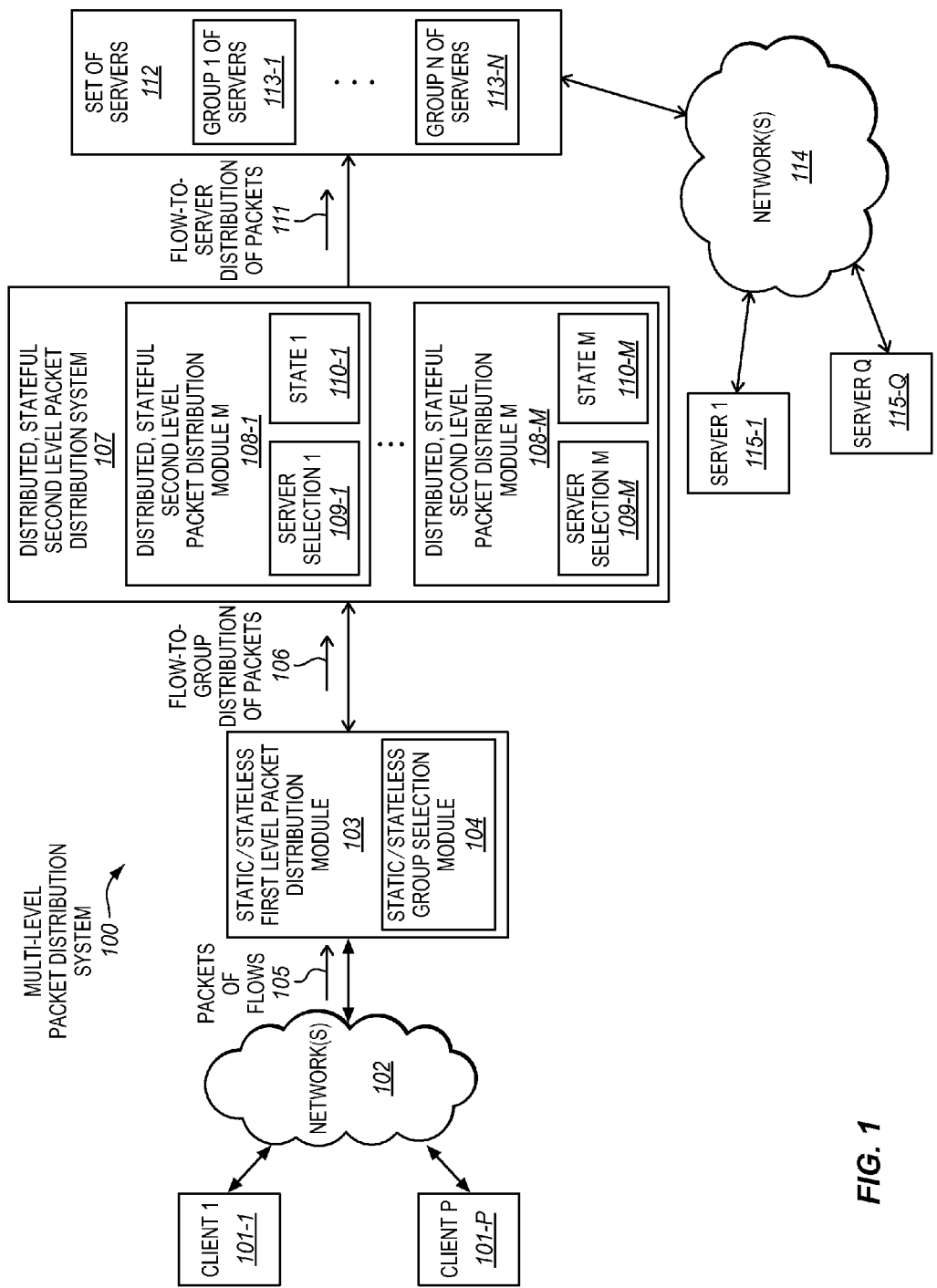
FIG. 1 is a block diagram of a network having an embodiment of a multi-level packet distribution system that is operable to distribute flows of packets among servers that are assigned to process the packets while providing stickiness of the flows to the servers.

FIG. 1 is a block diagram of a network having clients 101 that are operable to transmit flows of packets, servers 112 that are operable to process the packets, and an embodiment of a multi-level packet distribution system 100 that is operable to distribute the packets among the servers and provide stickiness of the flows to the servers assigned to process the packets of the flows. In some embodiments, the multi-level packet distribution system may represent a multi-level server load balancing system and may be used to approximately evenly distribute or balance workloads associated with processing the packets among the servers. Other embodiments are not limited to such server load balancing.

Clients 101 are coupled, connected, or otherwise in communication through one or more networks 102 to the multi-level packet distribution system 100. In the illustration, client 1 101-1 through client P 101-P are shown, where P may be any integer number. Each client may represent a combination of hardware and software (e.g., an operating system and client application) that is capable of accessing services and/or resources over one or more network connections. Examples of suitable clients include, but are not limited to, wireless client devices (e.g., mobile phones, laptops, mobile computers, hand held devices, etc.) and wired client devices (e.g., desktop computers, set top boxes, etc.). The clients are operable to transmit or send packets of connections or other flows 105 through the one or more networks to the multi-level packet distribution system.

The multi-level packet distribution system 100 is coupled, connected, or otherwise in communication with the one or more networks 102 to receive the packets of the flows 105 from the clients 101. The multi-level packet distribution system 100 is also coupled, connected, or otherwise in communication with a set of servers 112. Each server may represent any combination of hardware and software (e.g., an operating system and server application) that is capable of providing services and/or content to clients through one or more network interfaces and/or otherwise operating as a server. Examples of suitable servers include, but are not limited to, executable software on blades (e.g., blade servers), control cards, service cards, processors, processor cores, etc. As shown in the illustration, in some embodiments, the servers are logically associated or grouped into multiple groups 113. In the illustration the servers are logically grouped into group 1 113-1 through group N 113-N, where N may be any integer number. At least one of the groups has a plurality of servers and the other groups may each have one or more servers. In some cases, each of the groups has a plurality of servers. In some embodiments, a server may be shared by more than one group (i.e., groups may be overlapping).

The multi-level packet distribution system is operable to distribute the packets of the flows 105 among the servers of the set of servers 112. In some embodiments, the multi-level packet distribution system may distribute packets in a way that provides or maintains stickiness of flows of the packets to servers assigned to process the packets of the flows. Such flow stickiness is also sometimes referred to as flow persistence. Distribution of packets with flow stickiness or flow persistence may involve distributing all of the packets of a flow to the same server. The multi-level packet distribution system may initially allocate a flow (e.g., based on a first packet of the flow) to one of the servers. For example, the initial packet of an incoming flow (e.g. SYN packet of a TCP connection, an INIT packet of an SCTP connection, etc.) is forwarded to a server. Subsequently, all of the other packets encountered for the same connection or flow may be forwarded to the same server. Commonly, each server maintains state (e.g., session data) that is associated with the flows that it is assigned to process. This state is often not maintained by, or available to, the other servers, but is often needed in order to properly process the packets of the flows. For example, this is often the case for connection oriented transport protocols like TCP, SCTP, etc.

A flow may represent network traffic that is identified by a common set of attributes that characterize the flow. As used herein, a flow represents more than a single packet (i.e., has at least two packets). As a first example, a flow may represent network traffic identified by five tuple attributes (e.g., Source/Destination IP address, Protocol, Source/Destination TCP/UDP ports). As a second example, a flow may represent network traffic identified by Source/Destination MAC addresses. As a third example, a flow may represent network traffic identified by VLAN IDs. As a fourth example, a flow may represent network traffic identified by source and destination nodes of the traffic. As a fifth example, over a certain link from node a to node b packets passing over the link with a specific source IP address (e.g. IP1) may represent a flow identified by the source IP address over that link with the attributes (IP1, a, b). As a sixth example, in an access network, traffic originated from a subscriber may represent a flow identified as the traffic passing through a specific port of the residential gateway. Such subscriber flows in access and edge networks may also be identified by the subscriber IP addresses. Upstream/downstream subscriber flow (the flow from the subscriber/network side to the network side/subscriber) may have the IP address of the subscriber as the source/destination IP address respectively. A flow may include a single flow, multiple sub-flows, or many sub-flows. A larger coarse-grained flow may include multiple smaller finer-grained sub-flows. For example, an aggregate flow passing thorough a link (from node a to node b) with multiple destination IP addresses has a coarser granularity than a sub-flow passing through the same link with a single destination IP address. The former flow can be referred to as link flow and the latter flow can be referred to as link, destination IP flow.

The multi-level packet distribution system 100, which in this case is a two-level packet distribution system, includes a static and/or stateless first level packet distribution module 103 and a distributed, stateful second level packet distribution system 107. The static/stateless first level packet distribution module 103 is coupled, connected, or otherwise in communication with the one or more networks 102 to receive the packets of the flows 105. The static/stateless first level packet distribution module includes a static/stateless group selection module 104. The static/stateless group selection module is operable to statically and/or statelessly select a group of servers 113, from among the multiple groups of servers 113-1 through 113-N, for the packets of the flows 105. By statically/statelessly selecting the groups it is meant that the module does not need to use state to selecting the groups. There is no need to maintain state (e.g., a state table) that assigns or maps the packets of the flows to groups of servers. Especially when the number of connections to be handled is high, this may help to reduce resource exhaustion and/or hardware provisioning. It is not required that no state be maintained by the static/stateless first level packet distribution module, since some state may indeed be maintained (e.g., state other than a flow table and/or for other purposes besides selecting a group for a packet).

Rather, the module may use a static approach, such as, for example, a hash algorithm or other static algorithm (e.g., that statically determines the group based on the contents of the packet). For example, a hash function may map attributes of the packet to a group identifier of the selected group. A flow identifier may be generated from the packet (e.g., based on certain fields of the packets header). The flow ID may represent an ID or tag (e.g., a number) that is used to identify a flow. As one particular example, consider N (e.g., N=10) servers. A simple hash function may take the last byte of a source IP address (e.g. 192.168.1.122) of the packet as an integer (e.g., 122) and take modulo N (e.g., N=10). The resulting number (e.g., 2) is between 0 to N−1 which points to a group to which the packet is to be forwarded. For clarity, the term static does not imply that the selection needs to be unchanging, since the static selection may change, for example, if the number of groups changes (e.g., a group is added such that the hash function is performed with N=11, or a group is removed such that the hash function is performed with N=9). Rather, as mentioned, the term static refers to the lack of the use of state (e.g., a state table) to map or assign the packet to the group. The static/stateless first level packet distribution module is coupled, connected, or otherwise in communication to provide a flow-to-group distribution of packets 106 to the distributed, stateful second level packet distribution system 107. The static/stateful first level packet distribution module provides flow-to-group stickiness such that all packets of the flow are distributed to the same group. The static/stateless first level packet distribution module may be implemented in hardware, software, firmware, or various combinations thereof. In some embodiments, the static/stateless first level packet distribution module may include at least some particular hardware, circuitry, or logic (e.g., application specific circuitry), although this is not required.

The distributed, stateful second level packet distribution system 107 includes multiple distributed, stateful second level packet distribution modules 108. In the illustration, module 1 108-1 through module M 108-M are shown, where M may be any integer number. In some embodiments, each of the distributed, stateful second level packet distribution modules 108 may correspond to one or more of the groups of servers 113. Each of the distributed, stateful second level packet distribution modules 108 includes a corresponding distributed, stateful second level server selection module 109 and a corresponding state 110. In particular, the second level packet distribution module 1 includes a distributed, stateful second level server selection module 109-1 and a state 110-1, and the Mth second level packet distribution module M includes a distributed, stateful second level server selection module 109-M and a state 110-M. Each of the distributed, stateful second level server selection modules may be operable to statefully select a particular individual server, of the group of servers selected by the static/stateless first level packet distribution module 103, which is to process the packets of the flows 105. In some embodiments, the distributed, stateful second level packet distribution system may be used to achieve substantially uniform server load balancing across all of the servers within the group selected by the first level. Other embodiments are not limited to server load balancing.

In statefully selecting the server, the server selection module 109 may be operable to access and use the corresponding state 110. In some embodiments, the state may map or assign the flow to the selected server. By way of example, each state may represent a state table having entries that map different connections or flows (e.g., flow identifiers) to corresponding servers (e.g., server identifiers) assigned to handle the processing of the packets of the connections or flows. The packet distribution processing at level two tends to be more computationally intensive than that at level 1 but is distributed across the multiple packet distribution modules. Consequently, through such distribution, the state within each of the multiple packet distribution modules is generally less in amount than that which would be needed without such distribution. Storing each of these lesser amounts of state generally consumes less memory, and utilizing the state (e.g., performing table lookups) generally takes less time and consumes less processing resources. Advantageously, distributing the stateful second level packet distribution system helps to make the approach more scalable to large numbers of connections or other flows. The distributed, stateful second level packet distribution module is coupled, connected, or otherwise in communication to provide flow-to-server distribution or forwarding of packets 111 to the selected servers which may process the packets. The distributed, stateful second level packet distribution module may provide flow-to-server stickiness such that all packets of the flow are distributed to the same server.

As shown, and without limitation, in some embodiments, the set of servers 112 may be in communication with other servers 115 through one or more networks 114. By way of example, the servers 115 may provide services or content to the clients. For example, the clients may initiate connections with the servers 115 through the servers 112. The servers 112 may perform processing associated with the connections, such as, for example, subscriber management, deep packet inspection, or the like. Alternatively, in other embodiments, the servers 112 may be the connection or flow end points and the servers 112 may provide the full set of content and/or services for the clients.

In some embodiments, the multi-level packet distribution system may be implemented on a single network element (e.g., a single router). In other embodiments, the multi-level packet distribution system may be implemented on two or more connected network elements. In some embodiments, the first and second levels of the multi-level packet distribution system are implemented on different hardware.

The multi-level packet distribution system 100 may provide a number of advantages especially when the number of connections and/or amount of traffic is high. In recent years, there has been a significant increase in the number of networked devices and overall network traffic encountered on networks including the Internet. In addition, many of these connections, such as those providing video (e.g., video on demand, high definition television, etc), have relatively high bandwidth. As previously mentioned in the background section, certain known stateful load balancing approaches tend to suffer resource exhaustion especially when the number of connections and/or amount of traffic is high. However, the multi-level packet distribution system may help to avoid, or at least reduce, such resource exhaustion. The first level packet distributor module implements a static/stateless approach and does not need to retain state. The more computationally intensive tasks of packet distribution and the state keeping are performed in the second level which is distributed into multiple packet distribution modules. Each of the multiple packet distribution modules have an associated state, which is less in amount than that which would be needed without such distribution. Storing each of these lesser amounts of state generally consumes less memory, and utilizing the state (e.g., performing table lookups) generally takes less time and consumes less processing resources.

Figure 2:
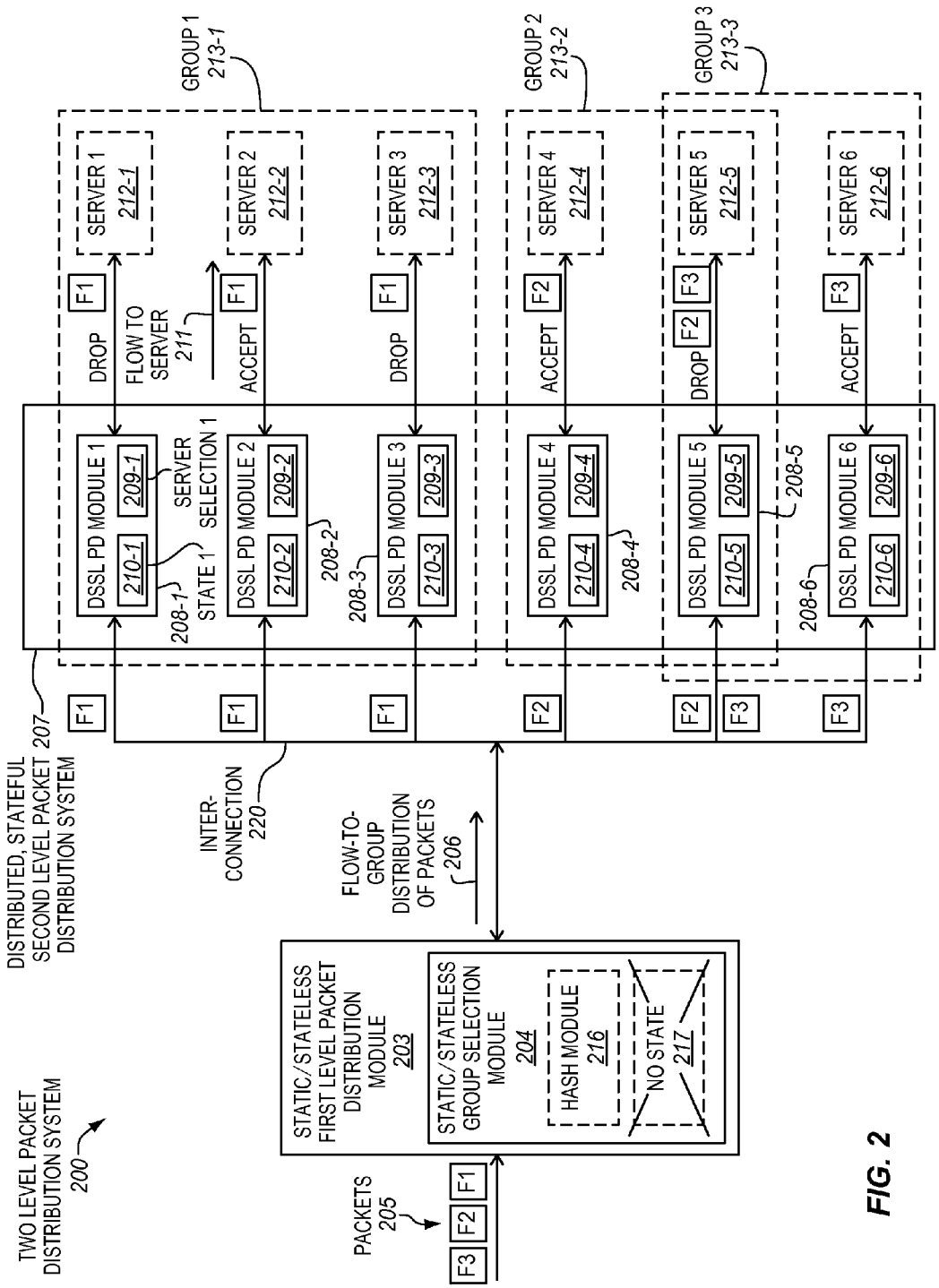
FIG. 2 is a block diagram of a more detailed embodiment of a two level packet distribution system that is operable to distribute packets among servers and provide stickiness of flows of the packets to the servers.

FIG. 2 is a block diagram of a more detailed embodiment of a two level packet distribution system 200. In some embodiments, the two level packet distribution system may be used for server load balancing and/or to substantially evenly distribute loads associated with processing packets among servers. Other embodiments are not limited to load balancing.

The two level packet distribution system 200 includes a static/stateless first level packet distribution module 203 and a distributed, stateful second level packet distribution system 207. The static/stateless first level packet distribution module includes a static/stateless group selection module 204. In some embodiments, the static/stateless group selection module may include a hash module 216 to select a group for a flow by performing a hash (e.g., based on contents of a packet). As shown, in some embodiments, the static/stateless group selection module may omit state 217 assigning the packet of the flow to the selected group of servers. The static/stateless first level packet distribution module may provide a flow-to-group packet distribution 206.

The distributed, stateful second level packet distribution system 207 is coupled, connected, or otherwise in communication with the static/stateless first level packet distribution module 203. In the illustrated embodiment, the second level packet distribution system includes six distributed, stateful second level (DSSL) packet distribution (PD) modules 208-1 through 208-6. Each of the DSSL PD modules 208-1 through 208-6 correspond to a respective one of six servers 212-1 through 212-6. For example, DSSL PD module 3 208-3 corresponds to server 3 212-3. While six servers and six DSSL PD modules are shown in the illustrated embodiment, in other embodiments there may be fewer or more servers and/or DSSL PD modules. The servers are shown in dashed lines to indicate that they are not part of the two level packet distribution system 200. Each of the six DSSL PD modules has a corresponding server selection module 209-1 through 209-6 and a corresponding state 210-1 through 210-6. For example, DSSL PD module 3 208-3 has server selection module 209-3 and state 210-3 (e.g., a state table). The server selection modules and state may be as previously described. Each of the DSSL PD modules performs packet distribution calculations (e.g., server selection calculations) and makes packet distribution decisions for its corresponding server. The distributed stateful second level packet distribution system and/or the DSSL PD modules provide a flow-to-server packet distribution 211.

In the illustrated embodiment, for purposes of illustration, the servers and their corresponding DSSL PD modules are logically divided into three groups. In particular, servers 1-3 and DSSL PD modules 1-3 are in group 1, servers 4-5 and DSSL PD modules 4-5 are in group 2, and servers 5-6 and DSSL PD modules 5-6 are in group 3. The static/stateless first level packet distribution module may select one of these groups 1-3 and the flow-to-group packet distribution 206 may distribute the packet to one of these groups 1-3. The DSSL PD modules within the selected group may select one of the servers within the selected group and the flow-to-server packet distribution 211 may forward the packet to the selected server.

To better illustrate an embodiment of operation of the two level packet distribution system, consider reception of a first packet [F1] of a first flow, a second packet [F2] of a second flow, and a third packet [F3] of a third flow, at the static/stateless first level packet distribution module 203. The static/stateless first level packet distribution module 203, in this example, may statically/statelessly select group 1 for the first packet [F1], group 2 for the second packet [F2], and group 3 for the third packet [F3]. In some embodiments, the packets may be provided or distributed to each of the DSSL PD modules of the selected group. As shown, the first packet [F1] may be distributed to each of DSSL PD modules 1-3, the second packet [F2] may be distributed to each of DSSL PD modules 4-5, and the third packet [F3] may be distributed to each of DSSL PD modules 5-6. In some embodiments, the DSSL PD modules within each group may share a multicast and/or broadcast domain and the packets may be multicast and/or broadcast to the DSSL PD modules within each group. In some embodiments, the DSSL PD modules within each group may share a virtual local area network (VLAN) identifier. For example, the DSSL PD modules within group 1 may have VLAN ID #1, the DSSL PD modules within group 2 may have VLAN ID #2, and the DSSL PD modules within group 3 may have VLAN ID #3.

In some embodiments, the second level packet distribution modules within each group may collectively perform packet distribution in a distributed fashion to assign the packet of the flow to an appropriate server within each group. In some embodiments, as a consequence of flow stickiness, each packet for a given flow may only be accepted for processing by one server and the other servers within the group may drop the packet. In the illustrated embodiment, for example, DSSL PD module 2 may select server 2 and cause its copy of packet [F1] to be accepted for processing by server 2, whereas DSSL PD modules 1 and 3 may not select their corresponding server and may cause their corresponding copies of packet [F1] to be dropped. Similarly, DSSL PD module 4 may select server 4 and cause its copy of packet [F2] to be accepted for processing by server 4, whereas DSSL PD module 5 may not select server 5 and may cause its corresponding copies of packets [F2] and [F3] to be dropped. Continuing, DSSL PD module 6 may select server 6 and cause its copy of packet [F3] to be accepted for processing by server 6. This is just one illustrative example and that the scope of the invention is not limited to this example.

Figure 3:
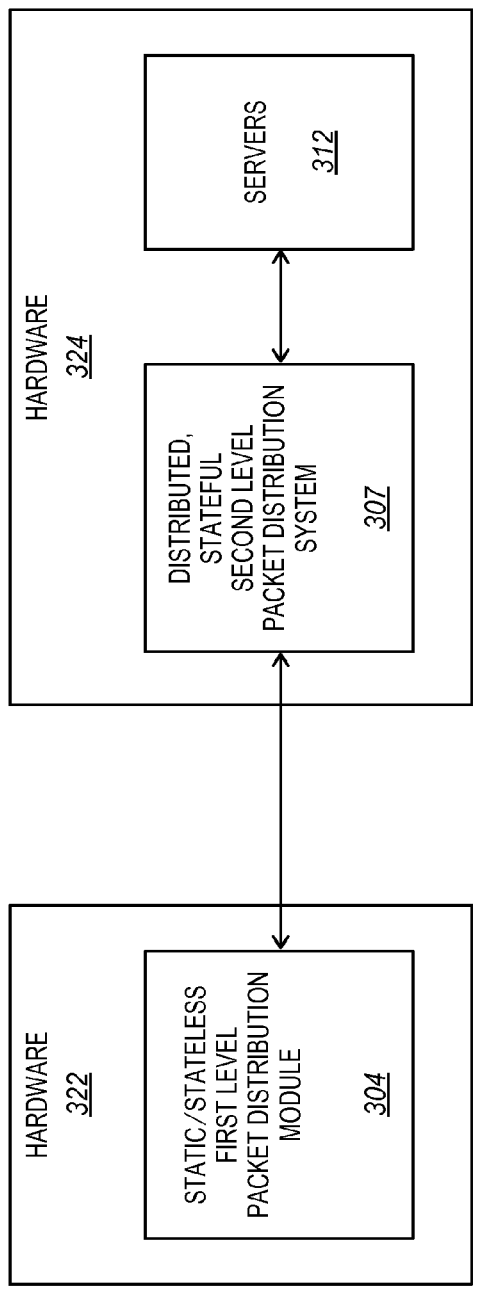
FIG. 3 is a block diagram of a two level packet distribution system including a static/stateless first level packet distribution module that is implemented on hardware that is distinct from hardware used to implement a distributed, stateful second level packet distribution system.

FIG. 3 is a block diagram of a two level packet distribution system including a static/stateless first level packet distribution module 304 that is implemented on hardware 322 that is distinct from hardware 324 used to implement a distributed, stateful second level packet distribution system 307. By way of example, the different hardware may be hardware in different network elements, different hardware portions of a network element, different boards, different cards, different processors, different processor cores, etc. In some embodiments, in addition to some hardware being distinct, some hardware may be shared. In some embodiments, the hardware 324 used to implement the distributed, stateful second level packet distribution system 307 may be the same as, or may otherwise include, hardware used to implement a set of servers 312 for which the two level packet distribution system performs packet distribution. By way of example, a distributed, stateful second level packet distribution module of the system 307 and one of the servers 312 may share hardware of a portion of a network element, a blade, a board, a card, a processor, or a processor core. Advantageously, most of the memory and computation intensive tasks of the overall packet distribution system may be offloaded to the existing memory and processing resources of the servers. Sharing such hardware may help to make the distributed stateful second level packet distribution scalable to large numbers of connections or other flows without excessive extra hardware provisioning being needed due to the ability to make use of existing hardware. In some embodiments, the hardware 322 and the hardware 324 may be within a single network element. In other embodiments, the hardware 322 and the hardware 324 may be within two or more connected network elements.

Figure 4:
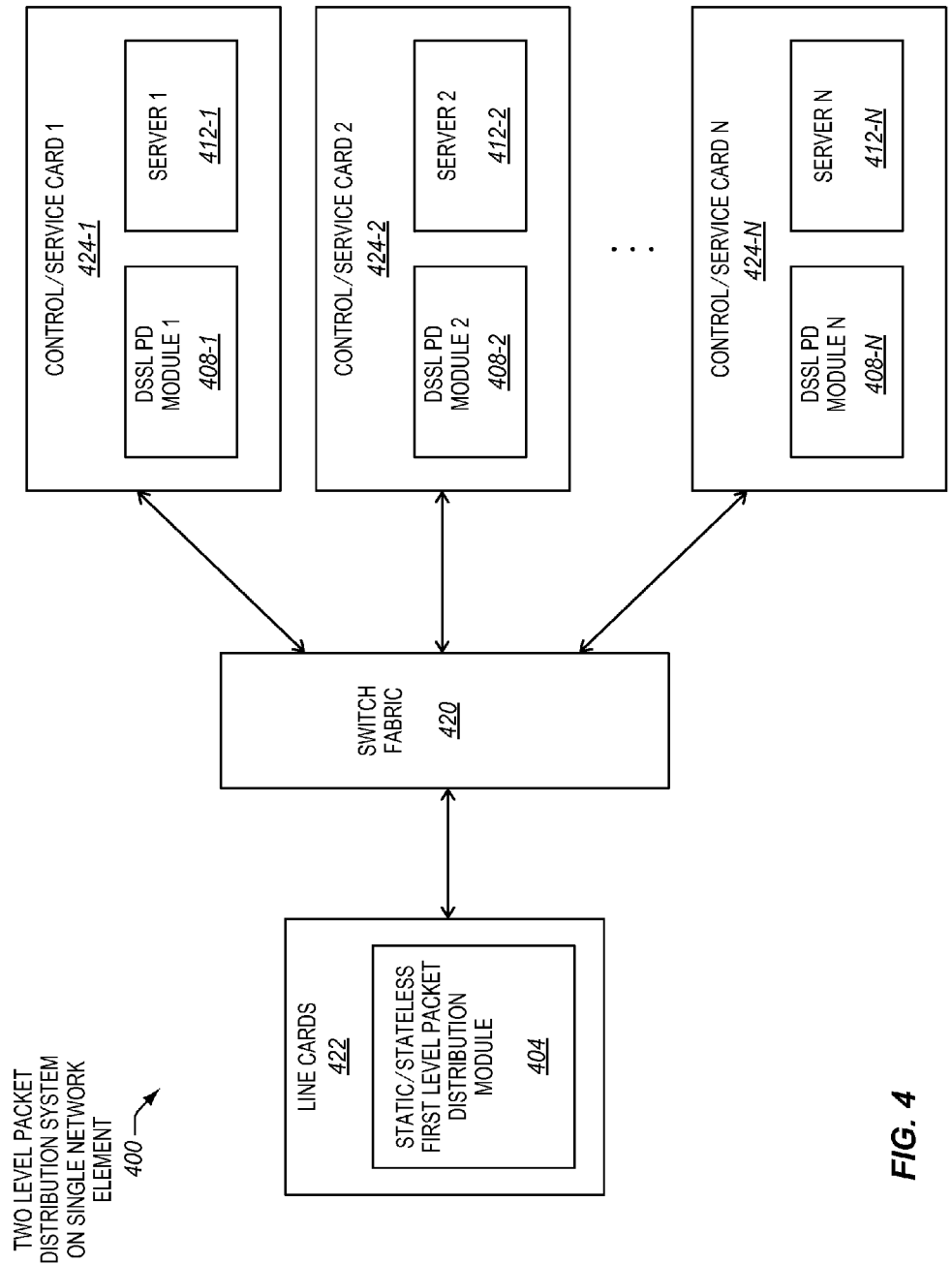
FIG. 4 is a block diagram of a two level packet distribution system implemented in a single network element.

FIG. 4 is a block diagram of a two level packet distribution system implemented in a single network element. Network elements are commonly separated into a control plane and a data plane (sometimes referred to as a forwarding plane or a media plane). In the case that the network element is a router (or is implementing routing functionality), the control plane typically determines how data (e.g., packets) is to be routed (e.g., the next hop for the data and the outgoing port for that data), and the data plane is in charge of forwarding that data. For example, the control plane typically includes one or more routing protocols that communicate with other network elements to exchange routes and select those routes based on one or more routing metrics. Routes and adjacencies are stored in one or more routing structures on the control plane. The control plane programs the data plane with information based on the routing structure(s). The data plane uses these forwarding and adjacency structures when forwarding traffic. For layer 2 forwarding, the network element can store one or more bridging tables that are used to forward data based on the layer 2 information.

In some embodiments, a network element includes a set of one or more line cards, a set of one or more control cards, and optionally a set of one or more service cards (sometimes referred to as resource cards). In other embodiments, a network element includes a set of one or more line cards, and a set of one or more service cards. These cards are coupled together through one or more mechanisms (e.g., a first full mesh coupling the line cards and a second full mesh coupling all of the cards, a switch fabric, a backplane, etc.). The set of line cards make up the data plane, while the set of control cards and/or service cards provide the control plane and exchange packets with external network element through the line cards. The set of service cards can provide specialized processing (e.g., Layer 4 to Layer 7 services (e.g., firewall, IPsec, IDS, P2P), VoIP Session Border Controller, Mobile Wireless Gateways (GGSN, Evolved Packet System (EPS) Gateway)). By way of example, a service card may be used to terminate IPsec tunnels and execute the attendant authentication and encryption algorithms.

Referring again to FIG. 4, the network element includes one or more line card(s) 422, a switch fabric 420, and a set of control and/or service cards 424. The cards may be fully interconnected together in conventional ways. In the illustrated embodiment, N control and/or service cards are shown, where N may be any integer number. In the illustrated embodiment, the static/stateless first level packet distribution system 404 is implemented on the line cards 422. A distributed, stateful second level packet distribution system 408 is implemented on the set of control and/or service cards 424. The control and/or service cards are also used to implement servers 412. In particular, DSLL PD module 1 408-1 is implemented on control/service card 1 424-1 that also implements server 1 412-1, DSLL PD module 2 408-2 is implemented on control/service card 2 424-2 that also implements server 2 412-2, and DSLL PD module N 408-N is implemented on control/service card N 424-N that also implements server N 412-N. The first level packet distribution module may embed information about a selected group (e.g., a group ID) of the control/service cards in a packet and forward the packet to the switch fabric. The switch fabric, which in one embodiment includes a set of switch cards, may use the information about the selected group (e.g., the group ID) to perform multicasting and/or broadcasting to all the control/service cards of the selected group.

Figure 5:
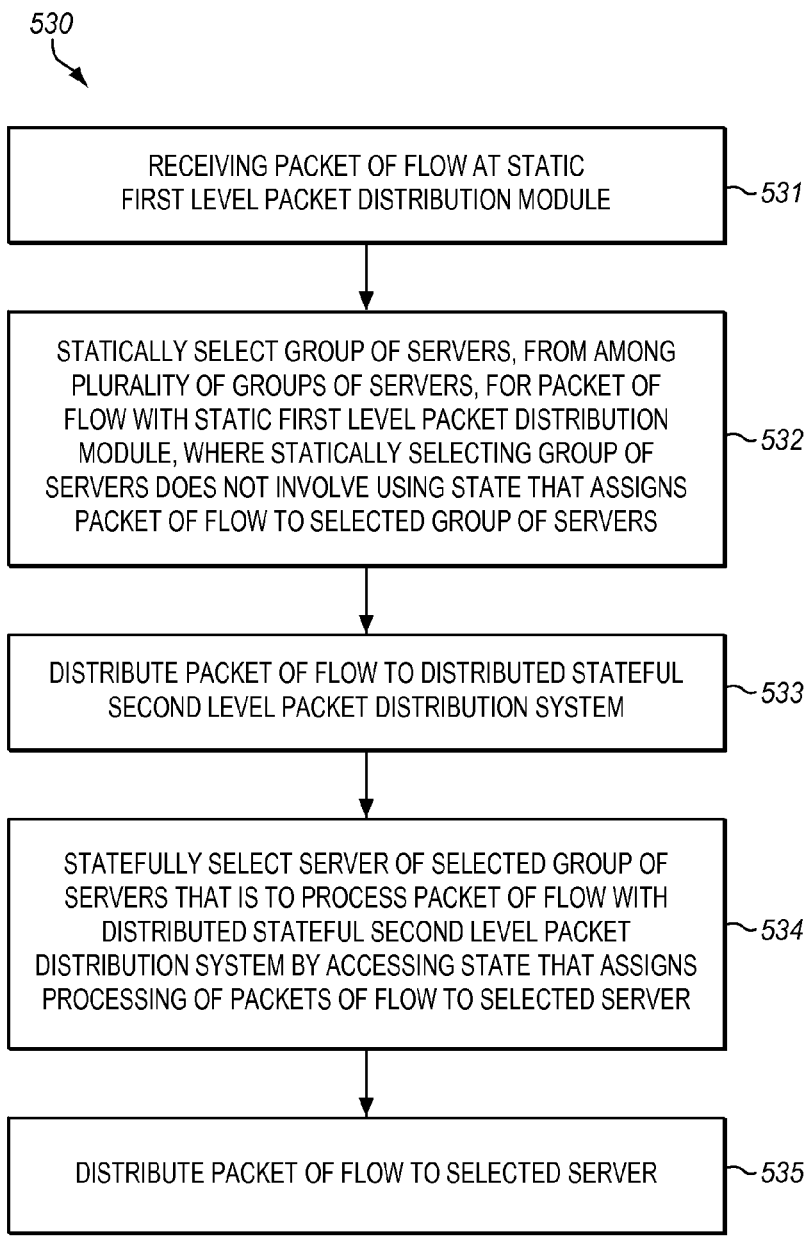
FIG. 5 is a block flow diagram of an embodiment of a method, which may be performed in one or more network elements that are in communication between clients that transmit packets and servers, of distributing the packets among the servers which are to process the packets, while providing stickiness of flows of the packets to servers assigned to process the packets of the flows.

FIG. 5 is a block flow diagram of an embodiment of a method 530, which may be performed in one or more network elements that are in communication between clients that transmit packets and servers, of distributing the packets among the servers which are to process the packets, while providing stickiness of flows of the packets to servers assigned to process the packets of the flows. In some embodiments, the method 530 may be performed by the multi-level packet distribution system 100 of FIG. 1 or the two level packet distribution system 200 of FIG. 2. In other embodiments, the method may be performed by other, different multi-level or two level packet distribution systems. Moreover, the multi-level packet distribution system 100 and the two level packet distribution system 200 may perform methods either the same as or different than the method 530.

The method includes receiving a packet of a flow at a static first level packet distribution module, at block 531. The packet may be of any known type and protocol. One advantage of the approaches disclosed herein is that they are not limited to any particular packet type or packet protocol (e.g., they are protocol agnostic). Flow stickiness may be achieved even in protocols that do not permit and/or without needing to include information about a server assigned to a flow within a packet or packet header.

A group of servers are statically selected for the packet of the flow, from among a plurality of groups of the servers, with the static first level packet distribution module, at block 532. In selecting the group of servers, there is no access or use of state (e.g., a flow table) that assigns the packet of the flow to the selected group of servers. In some embodiments, the group of servers are selected by performing a hash or the like with content from the packet.

The packet of the flow is distributed to a distributed, stateful second level packet distribution system, at block 533. In some embodiments, the packet of the flow is multicast, broadcast, or otherwise distributed to each of a set of distributed, stateful second level packet distribution modules. In some embodiments, the second level modules share a VLAN ID. In some embodiments, each of the set of distributed modules corresponds to a different server of the selected group. In some embodiments, the packet of the flow is distributed from hardware used to implement the first level packet distribution module to separate or distinct hardware that is used to implement the distributed, stateful second level packet distribution system, which in some cases is also used to implement the servers.

A server of the selected group of servers that is to process the packet of the flow is statefully selected with the distributed, stateful second level packet distribution system, at block 534. Statefully selecting the server may include accessing and using state that assigns processing of packets of the flow to the selected server. In some embodiments, each of a set of distributed, stateful second level packet distribution modules, which each correspond to a different server of the selected group, determine whether to cause the packet to be accepted for processing by the corresponding server or dropped. In an aspect, only one of the modules for the selected group determines that the packet is to be accepted while all other modules for the selected group determine that the packet is to be dropped.

The packet of the flow is distributed to the selected server, at block 535. The selected server may process the packet of the flow. In some embodiments, subsequently, other packets of the flow are directed to the same server by first selecting the same group and then selecting the same server such that flow stickiness is provided.

For certain types of flows, it is possible to detect the start of the flow or the first packet of the flow based only on the bits or content of the first packet of the flow without needing to consult other information. For example, an initial packet of a connection or flow may be identified as such in the contents of the initial packet. That is, the initial packet of a flow may have bits or content that indicates that the packet is the first packet of the flow. Examples of such types of packets include, but are not limited to, a TCP packet that has a SYN flag to indicate that it is the first packet in a flow, an SCTP packet that has an INIT flag to indicate that it is the first packet in a flow. Similarly, various other connection-oriented protocols commonly have a way of informing other network elements through contents of an initial packet that the packet is the first packet of a connection or flow. As a further example, a subscriber level flow can be identified by subscriber IP address (e.g. source/destination IP address of the upstream/downstream traffic). In such a case, a RADIUS start request or DHCP request may indicate the start of the subscriber level flow. As the Flow ID is based on the source IP address, new flow for a subscriber will be detected by sensing the RADIUS packet or DHCP packet which is generated to establish the subscriber session. Types of connections or flows for which it is possible to detect or identify the start of the flow or the first packet of the flow based only on the bits or content of the first packet of the flow without needing to consult other information are referred to as type 1 connections or flows.

Figure 6:
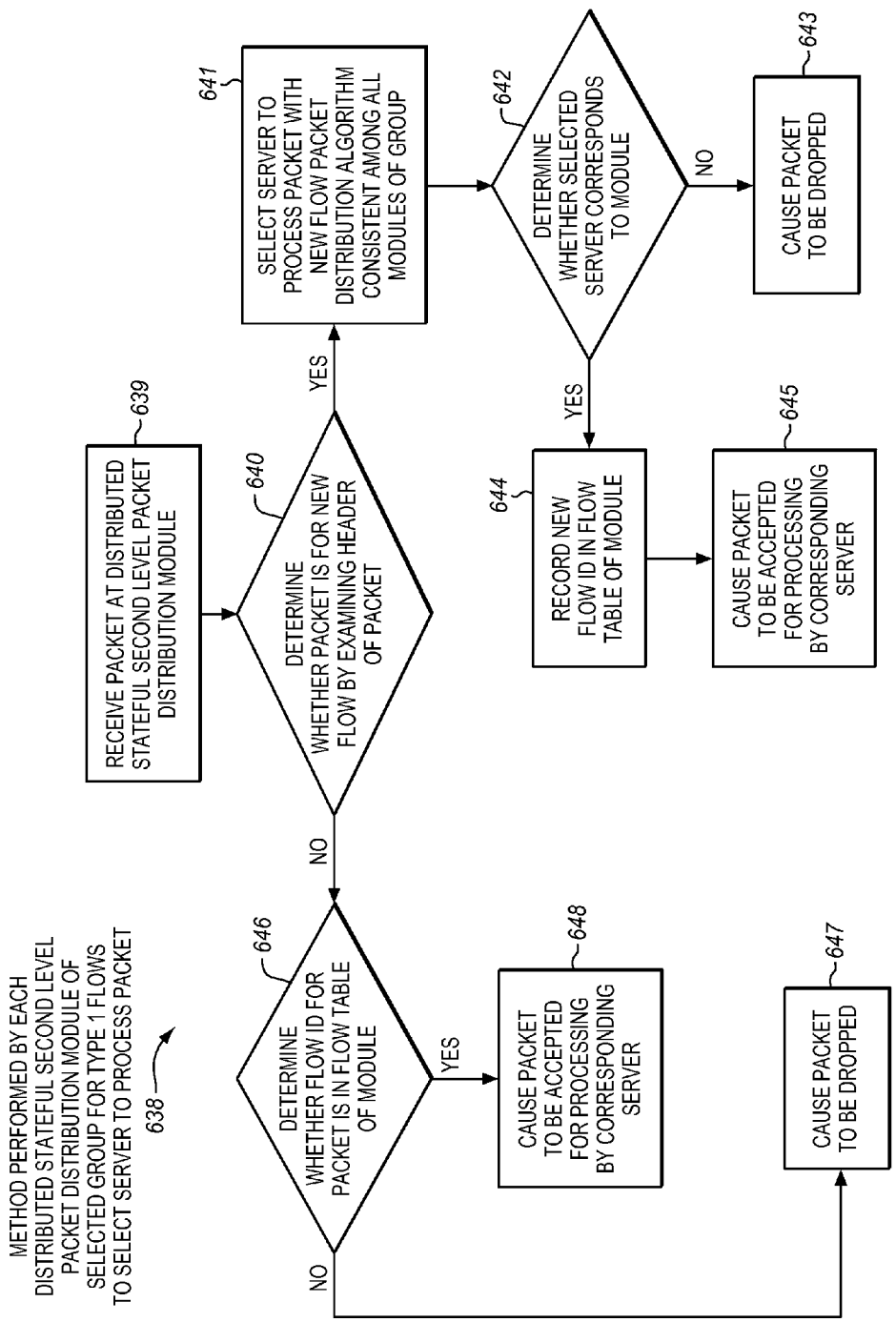
FIG. 6 is a block flow diagram of an embodiment of a method that may be performed by each distributed stateful second level packet distribution module of a selected group for type 1 flows to select a server to process a packet.

FIG. 6 is a block flow diagram of an embodiment of a method 638 that may be performed by each distributed stateful second level packet distribution module of a selected group for type 1 flows to select a server to process a packet. A packet is received at a distributed stateful second level packet distribution module, at block 639. A determination is made, at block 640, whether the packet is for a new flow by examining the packet (e.g., a header of the packet). For example, the packet or packet header may include a marker or flag indicating that it is an initial packet of a new flow. The second level packet distribution module may have a packet examination module to make this determination. If the packet is for a new flow (i.e., "yes" is the determination at block 640), the method advances to block 641. At block 641, a server to process the packet is selected with a new flow packet distribution algorithm that is consistent among all of the modules of the selected group. By the new flow packet distribution algorithm being consistent among all of the modules of the selected group, it is meant that instances of the algorithms on each of the modules of the selected group are operable to select the same identical server to process the packet (i.e., all consistently select the same server). For example, all of the modules of the selected group will select server 2 instead of any of the modules selecting a different server. In some embodiments, the algorithms are all identical. In other embodiments, the algorithms may be different but nevertheless yield consistent selections. The types of algorithms previously described are suitable, such as, for example, round robin, random selection, weighted round robin, weighted random selection, hash functions, etc., as well as various other know types of more sophisticated algorithms. As one specific example, each module may use a consistent (e.g., a same) hash function which maps a flow ID extracted from the packet to server IDs such that the same server will be selected and only that server will accept the packet for processing. In some embodiments, this algorithm may attempt to approximately equally distribute or balance loads associated with processing the packets among the servers (e.g., be used for server load balancing) for example through weights. Other embodiments are not limited to server load balancing.

A determination is made, at block 642, whether the selected server, which is selected by the module performing the method (i.e., the selected the server at block 641), corresponds to the module performing the method. For example, the determination would be "yes" if a module 2 corresponding to a server 2 selected server 2, or the determination would be "no" if the module 2 corresponding to the server 2 selected any other server besides server 2. The second level may have a determination module to make this determination. If the selected server does not correspond to the module (i.e., "no" is the determination at block 642), the method advances to block 643. At block 643, the module performing the method causes the packet to be dropped (e.g., the module drops the packet, the module does not forward the packet to the server, or the module causes the server to drop the packet, etc.). Alternatively, if the selected server does correspond to the module (i.e., "yes" is the determination at block 642), the method advances to block 644. At block 644, a new flow identifier (flow ID) is recorded in a flow table of the module performing the method. In some embodiments, the flow table may include a complete set of flow IDs for all flows assigned to the server corresponding to the module performing the method. In one aspect, the flow table may include pairs of flow IDs mapped to the server ID of the corresponding server. Alternatively, in another aspect, the flow table may only explicitly include the flow IDs and the server ID may be implicit or understood. The module causes the packet to be accepted for processing by the corresponding server, at block 645 (e.g., the module accepts the packet, the module forwards the packet to the server, or the module causes the server to accept the packet, etc.).

Referring again to block 640, if the packet is not for a new flow (i.e., "no" is the determination), the method advances to block 646. At block 646, a determination is made whether a flow identifier (flow ID) for the packet is in a flow table of the module performing the method. The second level may have a flow table checker module to make this determination. If the flow ID is not in the flow table, the module causes the packet to be dropped, at block 647. Typically, since the packet is not for a new flow, and the flow ID is not in the flow table of the module, it will be assumed that the flow ID is in a flow table of one of the other modules of the selected group. Alternatively, if the flow ID is in the flow table, the module causes the packet to be accepted for processing by the corresponding server, at block 648. Since the packet is for an existing flow listed in the flow table of the module performing the method, in order to maintain flow persistence or flow stickiness, the packet should be accepted for processing. The second level may have a determination module to make the determination of whether to accept or drop. Typically, all of the other modules performing the method may not find the flow ID for the packet in their flow tables (e.g., only one flow table includes the flow ID) and may cause the packet to be dropped so that it is not processed by their corresponding servers.

This is just one example of a suitable method. While the method has been shown in a relatively basic form, operations may optionally be added to and/or removed from the method. In addition, while a particular order of operations has been shown and described, it is to be understood that that particular order is exemplary. Alternate embodiments may optionally perform the operations in different order, combine certain operations, overlap certain operations, etc. For example, another embodiment may make the determination at block 646 prior to the determination at block 640.

For other types of connections or flows, it is not possible to detect the start of the flow, or the first packet of the flow, based only on the bits or content of the first packet of the flow without needing to consult other information. Such types of connections or flows are referred to herein as type 2 connections or flows.

Figure 7:
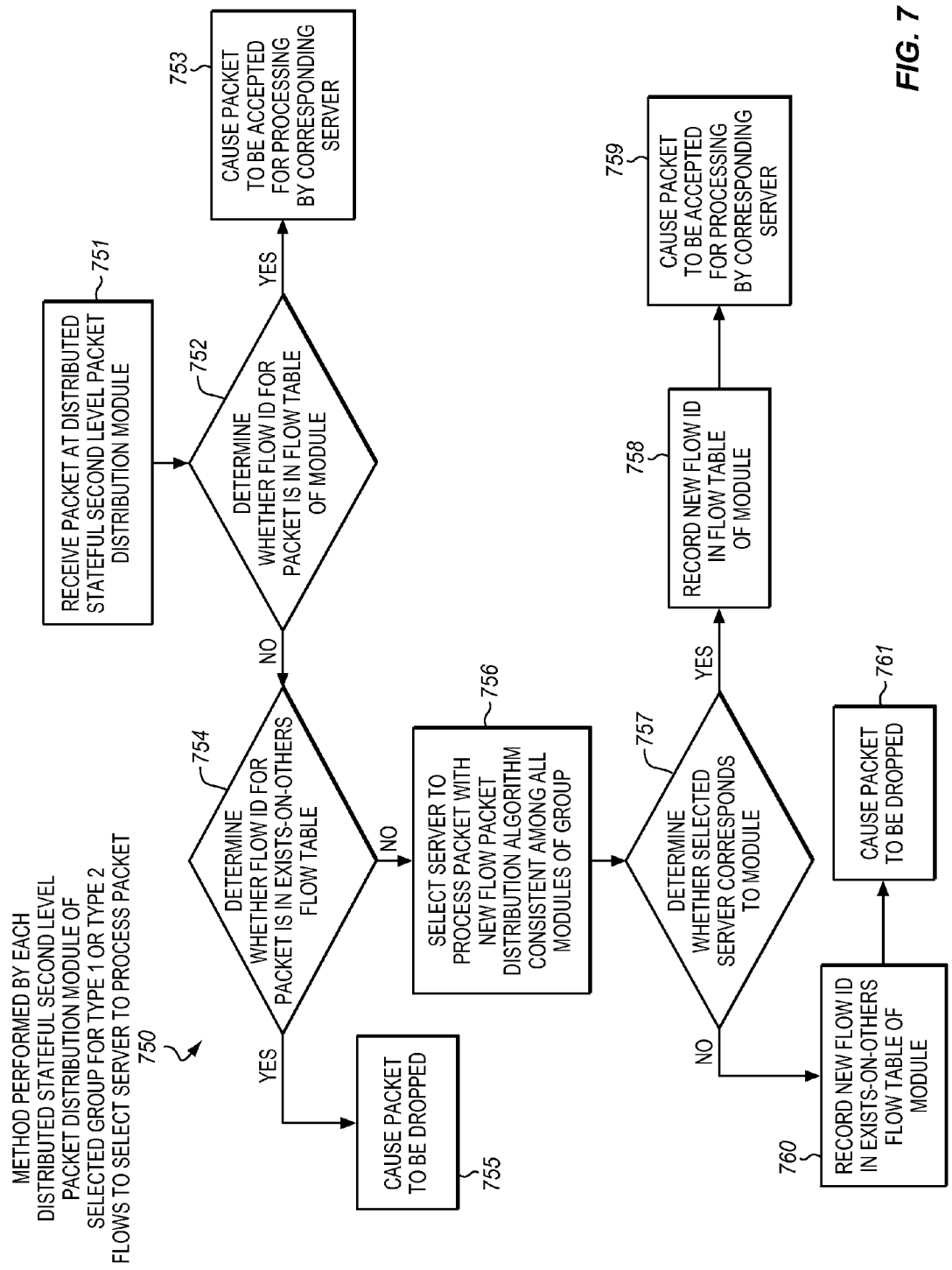
FIG. 7 is a block flow diagram of an embodiment of a method that may be performed by each distributed stateful second level packet distribution module of a selected group for type 1 or type 2 flows to select a server to process a packet.

FIG. 7 is a block flow diagram of an embodiment of a method 750 that may be performed by each distributed stateful second level packet distribution module of a selected group for type 1 or type 2 flows to select a server to process a packet. The method 750 is a generic approach that is not limited to any particular protocol or the need to detect a new flow from packet contents only. Such an approach may be used for type 1 flows, type 2 flows, or a combination of type 1 and type 2 flows. A packet is received at a distributed stateful second level packet distribution module, at block 751. A determination is made, at block 752, whether a flow ID for the packet is in a flow table of the module performing the method. If the flow ID is in the flow table (i.e., "yes" is the determination at block 752), the method advances to block 753. At block 753, the module causes the packet to be accepted for processing by the corresponding server. Alternatively, if the flow ID is not in the flow table (i.e., "no" is the determination at block 752), the method advances to block 754. At block 754, a determination is made whether the flow ID for the packet is in an exists-on-others flow table of the module performing the method. In some embodiments, the exists-on-others flow table may list or include flow IDs assigned to servers of the selected group other than the server corresponding to the module performing the method. The combination of the flow IDs included in the flow table of the module and the different flow IDs included in the exists-on-others flow table of the module represents identify all of the existing flows being serviced by the group of servers. The flow IDs in the flow table and the exists-on-others flow table of a given module are mutually exclusive. If the flow ID is in the exists-on-others flow table (i.e., "yes" is the determination at block 754), the module causes the packet to be dropped, at block 755.

Alternatively, if the flow ID is not in the exists-on-others flow table (i.e., "no" is the determination at block 754), the method advances to block 756. The fact that the flow ID of the packet does not exist in either the flow table of the module or the exists-on-others flow table of the module indicates inferentially that the packet is for a new flow. As such a new packet distribution decision may be made for the packet of the new flow. In some cases this decision may be made to achieve server load balancing, although this is not required. A server is selected to process the packet with a new flow packet distribution algorithm that is consistent among all of the modules of the selected group, at block 756. As previously mentioned, this refers to instances of the algorithms on each of the modules of the selected group selecting the same server to process the packet. A determination is made whether the selected server corresponds to the module performing the method, at block 757. If the selected server does correspond to the module performing the method (i.e., "yes" is the determination at block 757), a new flow ID for the packet is recorded or stored in a flow table of the module performing the method, at block 758. The module causes the packet to be accepted for processing by the corresponding server, at block 759. Refer again to block 757. If the selected server does not correspond to the module performing the method (i.e., "no" is the determination), a new flow ID for the packet is recorded or stored in the exists-on-others flow table of the module performing the method, at block 760. The module causes the packet to be dropped, at block 761.

An exists-on-others flow table may similarly be maintained by all of the other modules of the group. Each exists-on-others flow table allows the corresponding module to know which and how many flows are being handled by the other servers of the group. In some embodiments, this information in the set of exists-on-others flow tables may be used to inform or modify the new packet scheduling algorithm (e.g., to perform server load balancing). For example, the new flow packet distribution algorithm may distribute packets for new flows to a server with the fewest number of flows. In some embodiments, the modules of the group may exchange messages to synchronize the information about their flow tables and exists-on-others flow tables to maintain a consistent view of flows within the group.

Since the method 750 of FIG. 7 uses the exists-on-others flow tables, which need to be stored, it tends to consume more memory than the method 638 of FIG. 6. Also, maintaining and using the exists-on-others flow tables tends to take additional processing resources. For example, a lookup into the exists-on-others flow table may need to be performed upon arrival of each packet whose flow ID is not represented in the flow table of the module. Accordingly, performing the method 638 may offer certain advantages over performing the method 750 for type 1 flows. Fortunately, many of the more common types of connections or flows are type 1 connections or flows (e.g., TCP, SCTP, GTP, other connection oriented protocols, etc.). In some embodiments, the method 638 may be used for such types of flows without needing to perform the method 750. In other embodiments, the method 750 may be performed for all flows regardless of whether they are type 1 or type 2. In still other embodiments, the method 638 may be performed for the flows that are type 1 and the method 750 may be performed for the flows that are type 2 and/or for flows that are of both types.

This is just one example of a suitable method. While the method has been shown in a relatively basic form, operations may optionally be added to and/or removed from the method. In addition, while a particular order of operations has been shown and described, it is to be understood that that particular order is exemplary. Alternate embodiments may optionally perform the operations in different order, combine certain operations, overlap certain operations, etc. For example, another embodiment may make the determination at block 754 prior to the determination at block 752. As another example, the two methods may be merged into a single hybrid method.

Figure 8:
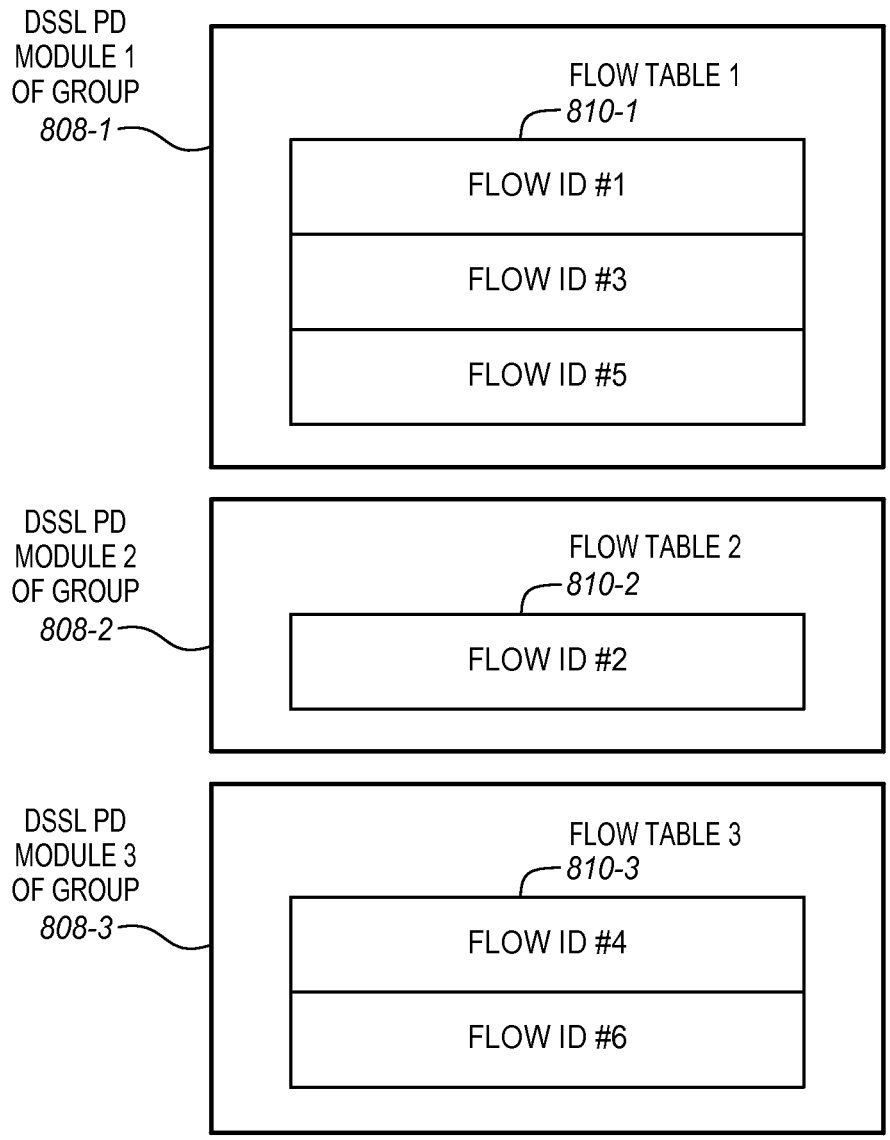
FIG. 8 is a block diagram of an embodiment of a set of distributed, stateful second level packet distribution modules of a group which have a corresponding example set of flow tables.

FIG. 8 is a block diagram of an embodiment of a set of distributed, stateful second level packet distribution (DSSL PD) modules 808 of a group which have a corresponding set of flow tables 810. In the illustrated embodiment, for purposes of illustration, the group has three DSSL PD modules 808-1, 808-2, 808-3 having three corresponding flow tables 810-1, 810-2, 810-3, although the scope of the invention is not so limited. Also, in the illustrated embodiment, for purposes of illustration, six flows having flow ID #1-6 are serviced by the group and represented in the flow tables, although the scope of the invention is not so limited. A first server corresponding to DSSL PD module 1 is assigned to service a first flow with flow ID #1, a third flow with flow ID #3, and a fifth flow with flow ID #5. Accordingly, flow ID #1, #3, and #5 are included in the flow table 810-1 of the DSSL PD module 1. A second server corresponding to DSSL PD module 2 is assigned to service a second flow with flow ID #2. Accordingly, flow ID #2 is included in the flow table 810-2 of the DSSL PD module 2. A third server corresponding to DSSL PD module 3 is assigned to service a fourth flow with flow ID #4 and a sixth flow with flow ID #6. Accordingly, flow ID #4 and #6 are included in the flow table 810-3 of the DSSL PD module 3.

Figure 9:
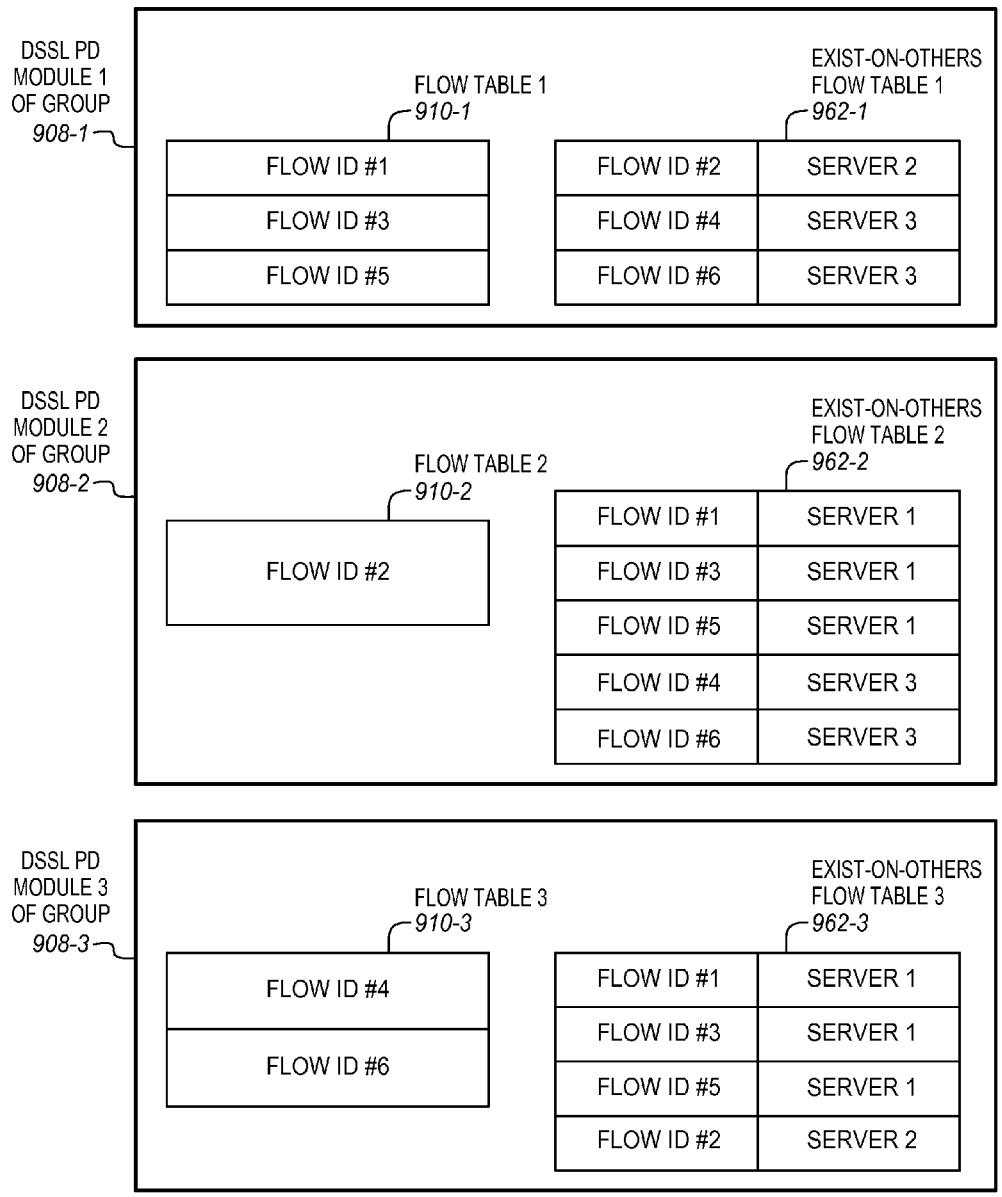
FIG. 9 is a block diagram of an embodiment of a set of distributed, stateful second level packet distribution modules of a group which have a corresponding example set of flow tables and a corresponding example set of exists-on-others flow tables.

FIG. 9 is a block diagram of an embodiment of a set of DSSL PD modules 908 of a group which have a corresponding set of flow tables 910 and a corresponding set of exists-on-others flow tables 962. In the illustrated embodiment, for purposes of illustration, the group has three DSSL PD modules 908-1, 908-2, 908-3 having three corresponding flow tables 910-1, 910-2, 910-3, although the scope of the invention is not so limited. Also, in the illustrated embodiment, for purposes of illustration, six flows having flow ID #1-6 are serviced by the group and represented in the flow tables, although the scope of the invention is not so limited. A first server corresponding to DSSL PD module 1 is assigned to service a first flow with flow ID #1, a third flow with flow ID #3, and a fifth flow with flow ID #5. Accordingly, flow ID #1, #3, and #5 are included in the flow table 810-1 of the DSSL PD module 1. A second server corresponding to DSSL PD module 2 is assigned to service a second flow with flow ID #2. Accordingly, flow ID #2 is included in the flow table 810-2 of the DSSL PD module 2. A third server corresponding to DSSL PD module 3 is assigned to service a fourth flow with flow ID #4 and a sixth flow with flow ID #6. Accordingly, flow ID #4 and #6 are included in the flow table 810-3 of the DSSL PD module 3.

Flow ID #2 corresponding to server 2, flow ID #4 corresponding to server 3, and flow ID #6 are corresponding to server 3 are included in the exists-on-others flow table 962-1 of DSSL PD module 1. Flow ID #1 corresponding to server 1, flow ID #3 corresponding to server 1, flow ID #5 corresponding to server 1, flow ID #4 corresponding to server 3, and flow ID #6 corresponding to server 3 are included in the exists-on-others flow table 962-2 of DSSL PD module 2. Flow ID #1 corresponding to server 1, flow ID #3 corresponding to server 1, flow ID #5 corresponding to server 1, and flow ID #2 corresponding to server 2 are included in the exists-on-others flow table 962-3 of DSSL PD module 3. As shown in the illustrated embodiment, the exists-on-others flow tables may, in some embodiments, identify the servers that correspond to (e.g., service) each flow ID. Advantageously, including the server IDs in the exists-on-others flow table helps to provide a fuller picture of the group and may, in some embodiments, be used for high availability purposes and/or to perform server load balancing. Alternatively, in other embodiments, the exists-on-others flow tables may merely list the flow IDs corresponding to the other servers.

Figure 10:
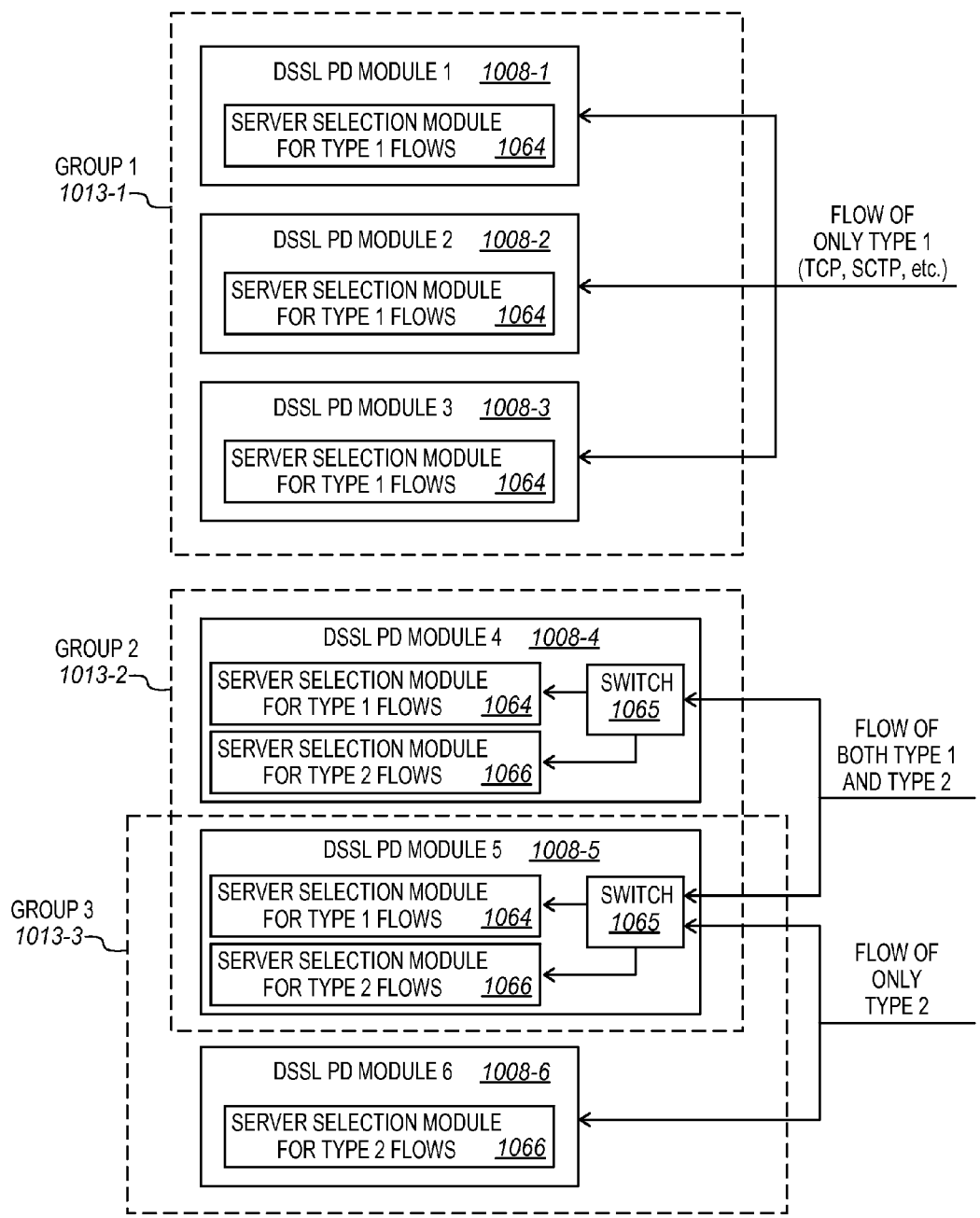
FIG. 10 is a block diagram of an embodiment of distributing type 1 and type 2 flows among groups of distributed, stateful second level packet distribution modules.

FIG. 10 is a block diagram of an embodiment of distributing type 1 and type 2 flows among groups 1013 of DSSL PD modules 1008. Group 1 1013-1 is dedicated to flows of only type 1. Examples of such flows include, but are not limited to, TCP and SCTP flows. Each of a DSSL PD module 1 1008-1, a DSSL PD module 2 1008-2, and a DSSL PD module 3 1008-1 have a server selection module 1064 that is operable to select servers for type 1 flows. By way of example, each of the server selection modules in group 1 may be operable to implement the method of FIG. 6.

Group 2 1013-2 is used for both type 1 and type 2 flows. For example, group 2 may be used for subscriber level flow management. A subscriber level flow may include both type 1 and type 2 sub-flows. For example, a subscriber may have different applications running on an end station, and some of the applications may use type 1 flows while others use type 2 flows. As another example, group 2 may be used for some type 1 flows and other type 2 flows regardless of whether they are subscriber flows. Each of a DSSL PD module 4 1008-4 and a DSSL PD module 5 1008-5 have both a server selection module 1064 that is operable to select servers for type 1 flows, and also a server selection module 1066 that is operable to select servers for type 2 flows. By way of example, each of the type 1 server selection modules 1064 may be operable to implement the method of FIG. 6, and each of the type 2 server selection modules 1066 may be operable to implement the method of FIG. 7. As shown, each of the DSSL PD modules in group 2 may also include a logical switch 1065 that is operable to examine incoming packets, determine whether the packets are for type 1 or type 2 flows, and correspondingly cause either the type 1 server selection module 1064 or the type 2 server selection module 1066 to be used.

Group 3 1013-3 is dedicated to type 2 flows. A DSSL PD module 6 1008-6 has a server selection module 1066 that is operable to select servers for type 2 flows.

Figure 11:
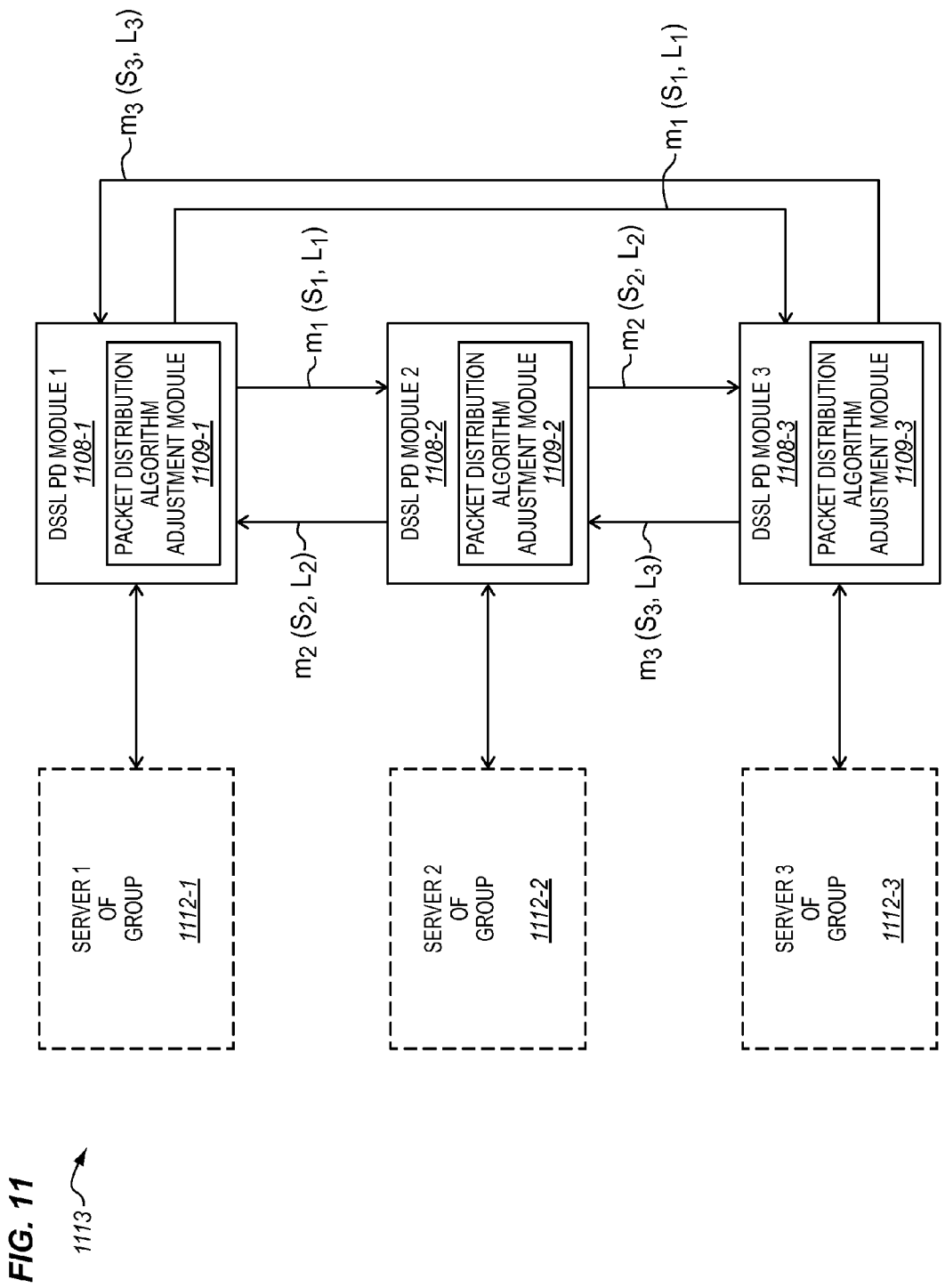
FIG. 11 is a block diagram of an embodiment of a group of distributed, stateful second level packet distribution modules that are operable to send messages to one another in which the messages indicate the states and/or loads of corresponding servers.

FIG. 11 is a block diagram of an embodiment of a group 1113 of DSSL PD modules 1108 that are operable to send messages to one another in which the messages indicate the states and/or loads of corresponding servers 1112. A DSSL PD module 1 1108-1 corresponds to a server 1 1112-1, a DSSL PD module 2 1108-2 corresponds to a server 2 1112-2, and a DSSL PD module 3 1108-3 corresponds to a server 3 1112-3. The servers and DSSL PD modules belong to the same group 1113. The DSSL PD module 1 sends a first message (m1) indicating a first state (S1) and a first load (L1) of the server 1 to DSSL PD module 2 and DSSL PD module 3. The DSSL PD module 2 sends a second message (m2) indicating a second state (S2) and a second load (L2) of the server 2 to DSSL PD module 1 and DSSL PD module 3. The DSSL PD module 3 sends a third message (m3) indicating a third state (S3) and a third load (L3) of the server 3 to DSSL PD module 1 and DSSL PD module 2. In one aspect, each DSSL PD module may broadcast or multicast a packet indicating the state and/or load to the other modules within its group. The DSSL PD modules may each include a message send module and a message receive module to respectively send and receive these messages. In some embodiments, each DSSL PD module may also send either the same or a different type of message indicating a state and/or a load to a first level packet distribution module. The packet may have any of various suitable formats or protocols. In another embodiment, the messages may include state information without including load information. In yet another embodiment, the messages may include load information without including status information.

The states represent states and/or status of the servers. Examples of suitable status/state include, but are not limited to, alive (e.g., active and able to process packets), gracefully shutting down (e.g., able to process packets for existing connections but not accepting new connections), leaving the group, joining the group, restarting (e.g., in process of recovering from a failure or restart), and the like, and combinations thereof. In one aspect, a message received from a DSSL PD module may implicitly, rather than explicitly, indicate the state. For example, when a message is received from a DSSL PD module it may be assumed that the corresponding server is alive and/or active. If a message is not received from a DSSL PD module within a certain amount of time then the corresponding server may be assumed to not be available. The loads may represent loads associated with the servers. Examples of suitable loads include, but are not limited to, current workload, number of connections, number of flows, load on a processor, thermal load (e.g., temperature), amount of memory consumed, flow table size, etc.).

The DSSL PD module 1 has a new flow packet distribution algorithm adjustment module 1109-1, the DSSL PD module 2 has a new flow packet distribution algorithm adjustment module 1109-2, and the DSSL PD module 3 has a new flow packet distribution algorithm adjustment module 1109-3. In some embodiments, each of the new flow packet distribution algorithm adjustment modules may be operable to dynamically adjust a packet distribution algorithm (e.g., a new flow packet distribution algorithm) based on the states and/or loads. For example, in some embodiments, the weights of a weighted new flow packet distribution algorithm, such as a weighted random choice or weighted round robin algorithm, may be dynamically adjusted based on the set of loads indicated in the messages exchanged within the group to take the current loads on the servers into account. Other ways of modifying other types of algorithms known in the arts are also contemplated. As another example, the DSSL PD modules of a group may modify their packet distribution algorithms to account for a given server no longer being available and/or to account for a given server being added to the group.

In different embodiments, the state and/or load information may be used for different purposes. In some embodiments, the state and/or load information may be used to distribute packets among the servers according to a packet distribution policy or objective. Examples include, but are not limited to, sever load balancing, quality of service guarantee, thermal load balancing, temperature management, etc. In some embodiments, the state and/or load information may be used in conjunction with implementing high availability. High availability is sometimes referred to as a resiliency, a redundancy, a failure protection, etc. High availability is commonly used to prevent or at least reduce disruption of service that may otherwise tend to occur when one or more servers become unavailable. The servers may become unavailable due to various potential reasons, such as, for example a hardware failure, a software failure, being taken down or offline to change software and/or hardware by an administrator, or the like. The messages exchanged between the DSSL PD modules may be used for, or may assist in, detecting when a server becomes unavailable. Thereafter, the services of the unavailable server may be transferred to one or more other servers so that there is no disruption in providing the services.

Various known high availability or redundancy configurations are suitable. Examples of suitable high availability configurations include, but are not limited to, active/passive configurations in which an active server has a fully redundant passive or standby server that is operable to become active if the active server is no longer available, active/active configurations in which one or more active servers are operable to backup another active server and handle that servers processing should that server no longer be available, N-active M-passive configurations where M passive servers (e.g., one or more) backup N active servers (e.g., a plurality), and the like, and combinations thereof. In various example embodiments, redundancy may be provided per server, per group, per set of groups, or globally (e.g., for all of the groups).

Consider an example of adding a new active server to a group. The new flow packet distribution algorithms of the DSSL PD modules may be modified to take the new active server into account. For example, assuming a hash based new flow packet distribution algorithm maps modulo n a source IP address to n servers in a group, when the new active server is added to the group the modulo may be taken n+1 instead of n to account for the new active server.

Advantageously, flow-to-server stickiness for the existing flows may be maintained when an additional given server is added to a group (i.e., there is no need to change the servers handling the existing flows). The new flow packet distribution algorithm is invoked only for new flows not for existing flows. Consider a type 1 flow that is handled by the method of FIG. 6. When a packet for an existing flow is received by a DSSL PD module, the DSSL PD module determines that the packet is for an existing flow by examining the header of the packet (e.g., at block 640). The DSSL PD module then determines whether the flow ID for the existing flow is in the flow table of the module (e.g., at block 646). The server that was serving the flow will find the associated flow ID in its corresponding flow table and will accept the packet (e.g., at block 648). Other servers will not find the flow ID in their respective flow tables and will drop the packet (e.g., at block 647). Thus, the flow-to-server stickiness is maintained for the existing flows when a new server is added to a group.

Similarly, consider a type 2 flow that is handled by the method of FIG. 7. When a given server is added to a group flow-to-server stickiness for the existing flows may be maintained (i.e., there is no need to change the servers handling the existing flows). Initially, the flow table and exists-on-others flow table corresponding to the added server are empty. The flow table is only populated when a new flow is accepted for processing by the corresponding server. When a packet for an existing flow is received, the DSSL PD module corresponding to the added server will determine that the flow ID for the packet is not in its corresponding flow table (e.g., at block 752). The exists-on-others flow table corresponding to the added server may be updated with the existing flows for the group prior to making decisions to accept or drop packets. After the exists-on-others flow table has been updated, since the packet is for an existing flow, the DSSL PD module will determine that the flow ID for the packet is in its exists-on-others flow table (e.g., at block 754) and will cause the packet to be dropped (e.g., at block 755).

An active server may also be removed from a group. For example, in an active/active configuration one of the active servers may fail or may be taken offline. In some embodiments, in order to provide high availability, the state of a given server may be maintained by one or more other active or passive servers that are intended to provide resiliency or high availability for the given server. For example, consider a type 1 flow and an active/passive high availability configuration. The passive or standby server may maintain state and a set of flows (e.g., a flow table) of each active server it is responsible for backing up. As another example, in an active/active high availability configuration, an active server may maintain at least that part of the state and a set of flows of another active server that it is responsible for backing up. When an active server fails, the server responsible for backing up that server may move the flow IDs to its flow table. The new flow packet distribution algorithms may also be modified to reflect that the server has been removed from the group. For example, a hash based algorithm may be performed modulo n−1 after the server is removed, whereas modulo n was performed prior to removal of the server, where n is the number of active servers in the group.

In some embodiments, messages indicating status may also be provided to a static/stateless first level packet distribution module. As long as the messages received by the first level packet distribution module indicate that at least one server of the group is active and available to process packets, the first level packet distribution module need not necessarily adjust its packet distribution approach. Rather, it may just keep distributing packets to the group as before. If no messages are received for a group within a certain amount of time, the first level packet distribution module may infer that all servers of the group are unavailable and may change its flow-to-group mapping so that the packets are provided to one or more other groups.

Figure 12:
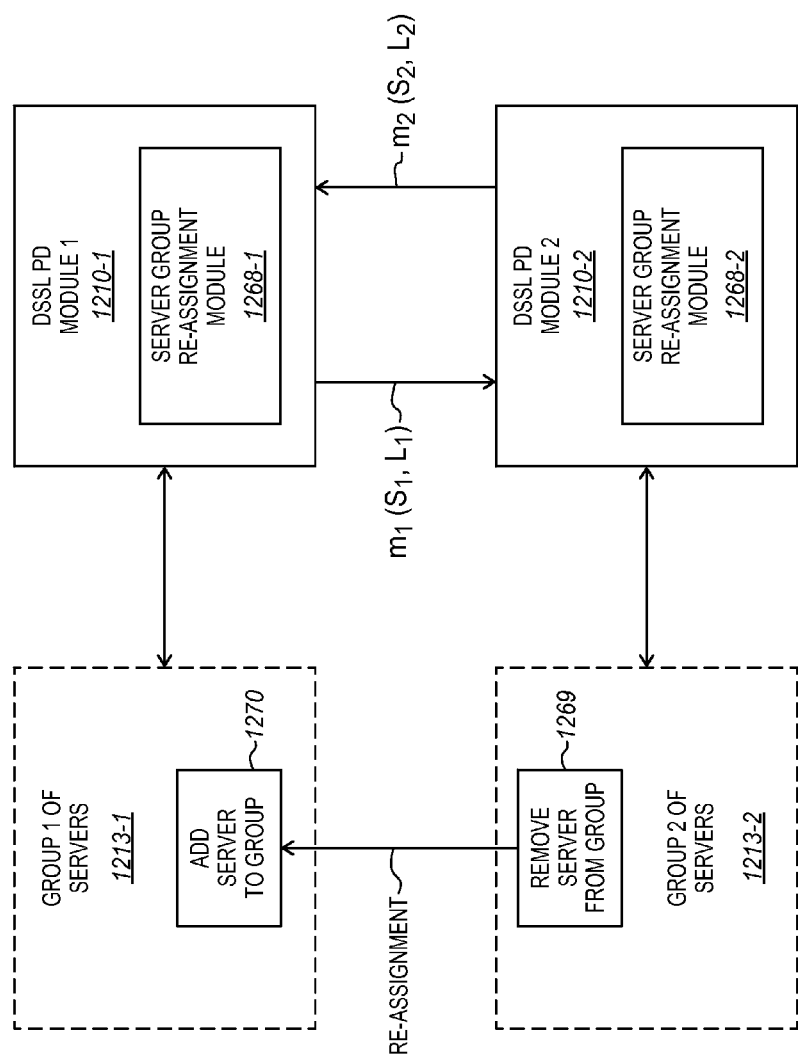
FIG. 12 is a block diagram of an embodiment of distributed, stateful second level packet distribution modules corresponding to different groups of servers exchanging messages with one another in which the messages indicate states and/or loads associated with the corresponding group of servers.

FIG. 12 is a block diagram of an embodiment of DSSL PD modules 1210 corresponding to different groups of servers exchanging messages with one another in which the messages indicate states and/or loads associated with the corresponding group of servers. A DSSL PD module 1 1210-1 corresponds to a group 1 of servers 1213-1. A DSSL PD module 2 1210-2 corresponds to a group 2 of servers 1213-2. The DSSL PD module 1 sends a first message (M1) that indicates a first state (S1) and a first load (L1) associated with the group 1 of servers. The DSSL PD module 2 sends a second message (M2) that indicates a second state (S2) and a second load (L2) associated with the group 2 of servers. The DSSL PD modules may each include a message send module and a message receive module to respectively send and receive these messages. In one aspect, the states and loads may be reflective of the entire group (e.g., a total number of active servers and an average load). In another aspect, the states and loads may include different corresponding states and loads for each server of the group. In some embodiments, one of the DSSL PD modules of a group, or an additional dedicated DSSL PD module shared by a group, may receive state and/or load information about other servers in the group via the messages exchanged as described above in conjunction with FIG. 11, and may then average and/or combine the states and loads into a message that is exchanged with the other groups.

The DSSL PD module 1 includes a server group re-assignment module 1268-1 that is operable to re-assign a server between groups of servers (e.g., from group 1 to group 2 and/or from group 2 to group 1). Similarly, the DSSL PD module 2 includes a server group re-assignment module 1268-2 that is operable to re-assign a server between groups of servers. In some embodiments, a server may be re-assigned between the groups to achieve a given objective and/or according to criteria (e.g., to achieve server load balancing, to achieve a guaranteed quality of service, to moderate temperatures across the servers, etc.). For example, a server may be dynamically and gracefully re-assigned between groups to more uniformly balance loads across the servers of the groups (e.g., when one group has more server resources than it needs and the other group does not have enough). In the context of server load balancing the ability to re-assign servers between groups allows for very highly uniform server load balancing to be achieved by the two level schemes disclosed herein when that is desired. As shown, in one embodiment, based on the messages exchanged, a server 1269 may be removed from group 2 and added as server 1270 to group 1.

It is commonly the case that a large percentage of the traffic in networks including the Internet is attributable to relatively few larger volume flows. These larger volume flows are sometimes referred to as elephant flows. A relatively small percentage of the traffic is attributable to a relatively large number of smaller volume flows. These smaller volume flows are sometimes referred to as mice flows.

Figure 13:
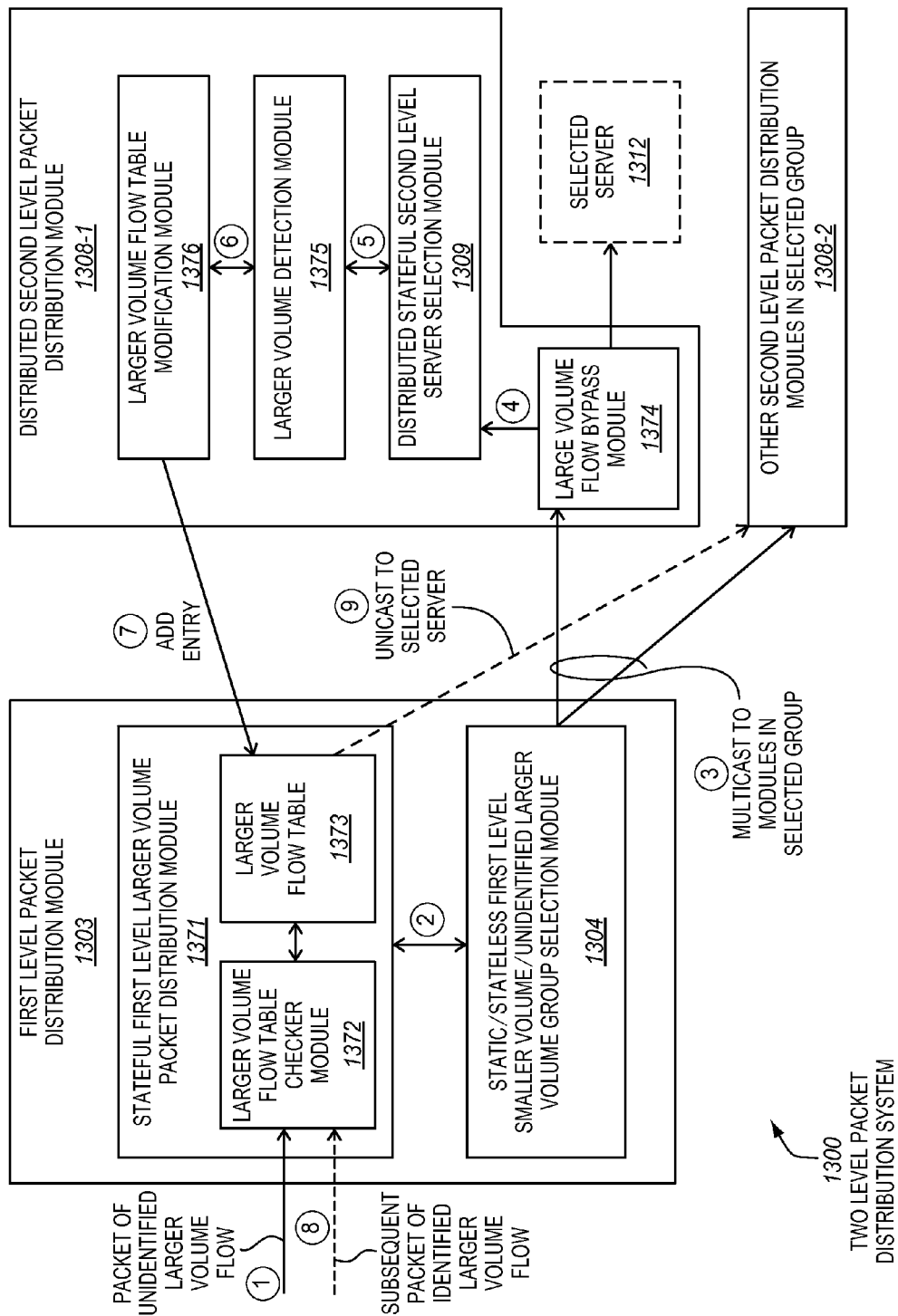
FIG. 13 is a block diagram of an embodiment of a two level packet distribution system that is operable to efficiently forward packets of larger volume flows (e.g., elephant flows) and smaller volume flows (e.g., mice flows).

FIG. 13 is a block diagram of an embodiment of a two level packet distribution system 1300 that is operable to efficiently forward packets of larger volume flows (e.g., elephant flows) and smaller volume flows (e.g., mice flows). As used herein, the terms larger and smaller volume flows are relative not absolute terms (i.e., a larger volume flow is larger than a smaller volume flow). The two level packet distribution system includes a first level packet distribution module 1303. The first level packet distribution module includes a stateful first level larger volume packet distribution module 1371 that is operable to distribute packets for already identified relatively larger volume flows. As shown at (1), assume that an incoming packet of an as-of-yet un-identified larger volume flow is received at the first level packet distribution module. The stateful first level larger volume packet distribution module includes a larger volume flow table 1373 that maps flow IDs for already identified larger volume flows (e.g., the elephant flows) to corresponding servers already assigned to handle the larger volume flows. The larger volume flow table represents state that is maintained for the larger volume flows. Since the larger volume flows are generally few in number the amount of state that needs to be stored and utilized is not excessive. A larger volume flow table checker module 1372 is operable to check the larger volume flow table for a flow ID corresponding to the incoming packet. Since the packet is from the as-of-yet un-identified larger volume flow (e.g., is the first or one of the initial packets of the larger volume flow), it has not yet been determined that the flow is a larger volume flow and the flow ID has not yet been recorded in the larger volume flow table.

As shown at (2), upon determining that the flow ID of the incoming packet is not in the larger volume flow table, a static/stateless first level smaller volume/unidentified larger volume group selection module 1304 is consulted. This module 1304 that is operable to distribute packets for smaller volume flows (e.g., mice flows), as the name implies, as well as for larger volume flows (e.g., elephant flows) that have not yet been identified and recorded as being such in the larger volume flow table. The module may use a static/stateless approach similar to or the same as those described elsewhere herein to select a group of servers. As shown at (3), the packet may be multicast, broadcast, or otherwise distributed to a set of distributed second level packet distribution modules 1308-1, 1308-2 in the selected group.

A distributed second level packet distribution module 1308-1 includes a large volume bypass module 1374. If the flow ID for the packet were in the larger volume flow table, and the packet was distributed to a selected server, then the larger volume bypass module is operable to cause the packet to be provided to the selected server 1312 for processing. However, as this is not the case for the presently considered packet of the as-of-yet un-identified larger volume flow, as shown at (4) a distributed stateful second level server selection module 1309 is used to select a server in the selected group that the packet is to be distributed to. An approach similar to or the same as those described elsewhere herein for server selection may be used. As shown at (5), a larger volume detection module 1375 is operable to detect larger volume flows. Various approaches are known in the arts to detect elephant or other larger volume flows. Simple approaches, for example, are to use past history, to designate certain source IP addresses as larger volume flows, etc. If the flow is detected as a mice flow there is no need to take further action. However, assume for purposes of illustration, that the larger volume detection module determines that the packet is for a larger volume flow. As shown at (6), a larger volume flow table modification module 1376 is invoked. As shown at (7), the modification module is operable to cause the larger volume flow table 1373 to be modified. For example, the modification module may instruct the larger volume flow table to add an entry that maps the flow ID for the packet to the selected server.

As shown at (8), when a subsequent incoming packet of the now identified larger volume flow is received at the first level packet distribution module, the lager volume flow table checker module will check the larger volume flow table. The flow ID for the now identified larger volume flow is now preserved as state in the larger volume flow table along with a corresponding server selected to process the packets of the larger volume flow. As shown at (9), the stateful first level larger volume packet distribution module may unicast or otherwise distribute the packet to the selected server indicated in the larger volume flow table. Accordingly, the first level packet distribution module is operable to perform both stateful flow-to-server unicast packet distribution for a portion of the flows (e.g., larger volume flows) and as static/stateless flow-to-group multicast packet distribution for a portion of the flows (e.g., smaller volume flows). In other embodiments, such a hybrid approach may be used for other criteria besides larger/smaller volume flows (e.g., particular types of traffic or connections).

The approach described above may offer certain potential advantages. For one thing, a large portion of the traffic (e.g., that of the elephant flows) may be detected and unicast forwarded to the corresponding server instead of needing to multicast the packets to all of the servers in a group. Depending upon the number of servers within the group, this may help to significantly reduce the amount packet traffic on the interconnection or coupling between the first and second levels. Also, some of the relatively more computationally intensive tasks which would otherwise be performed at the stateful second level may be avoided. Since the larger volume flow table may store state for flows that are relatively small in number, the amount of state is not excessive (e.g., the larger volume flow table may be relatively small) such that the memory to store the state and the time and processing to access the state are also not excessive. Furthermore, the relatively more computationally intensive tasks of detecting the larger volume flows as well as the stateful packet distribution has been offloaded to the distributed second level packet distribution module.

Having described various embodiments, a few additional alternative embodiments will now be described. Embodiments have been described with respect to two level packet distribution systems. However, other embodiments may have three or more levels. For example, a first level may statelessly map flows to bigger groups, a second level may statelessly map the flows to smaller sub-groups within the bigger groups, and a third level may statefully map the flows to individual servers within the sub-groups.

As another example, in some embodiments, a third level of packet distribution may be provided in support of service chaining among servers and/or the hardware on which servers are implemented. In service chaining, a packet may be distributed to a first server and/or first server-implementation hardware using the two level packet distribution approach previously described. Subsequently, after packet processing on the first server and/or first server-implementation hardware, a third level of packet distribution may be used to distribute the packet to a second server and/or second server-implementation hardware of the same network element. The first server and/or first server-implementation hardware, after processing the packet, may forward or distribute the packet to the second server and/or second server-implementation hardware of either the same or a different group within the same network element. As a simple example, assume a first server implemented on a first service card belongs to group 1, and an Nth server implemented on an Nth service card belongs to group N, and a packet is to be first processed on the first server, and then subsequently is to be sent to the Nth server for further processing. Also assume that the flow is a type 1 flow, which is not required. After processing the packet on the first server, a static/stateless third level packet distribution module corresponding to the first server and/or the first server implementation hardware may select a group (in this case group N). A static/stateless approach similar to that previously described for level 1 may be used. The packet may be broadcast or multicast to the group N. A second instance of distributed second level packet distribution may be performed on a distributed second level packet distribution module corresponding to the Nth server to select the Nth server to process the packet for processing. The Nth server may process the packet. If desired, additional chaining may be performed by generally repeating the process described above.

Embodiments have been described with respect to servers providing services to clients. Other embodiments are applicable to distributing packets among a set of clients. For example, a set of clients on one or more network elements (e.g., each on a different server blade) may initiate connections with outside nodes (e.g., servers). The two level packet distribution systems disclosed herein may be used to forward packets from the outside nodes (e.g., servers) to the clients maintaining flow stickiness.

In the description above, for the purposes of explanation, numerous specific details have been set forth in order to provide a thorough understanding of the embodiments of the invention. It will be apparent however, to one skilled in the art, that one or more other embodiments may be practiced without some of these specific details. The particular embodiments described are not provided to limit the invention but to illustrate it. Those skilled in the art will recognize that the invention can be practiced with modification and alteration within the spirit and scope of the appended claims. The description is thus to be regarded as illustrative instead of limiting. The scope of the invention is not to be determined by the specific examples provided above but only by the claims below.

In other instances, well-known circuits, structures, devices, and operations have been shown in block diagram form or without detail in order to avoid obscuring the understanding of the description. Further, where considered appropriate, reference numerals or terminal portions of reference numerals have been repeated among the figures to indicate corresponding or analogous elements, which may optionally have similar characteristics.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In the description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

Various operations and methods have been described. Some of the methods have been described in a basic form in the flow diagrams, but operations may optionally be added to and/or removed from the methods. In addition, while the flow diagrams show a particular order of the operations according to example embodiments, it is to be understood that that particular order is exemplary. Alternate embodiments may optionally perform the operations in different order, combine certain operations, overlap certain operations, etc. Many modifications and adaptations may be made to the methods and are contemplated.

Different embodiments of the invention may be implemented using different combinations of software, firmware, and/or hardware. Thus, the techniques shown in the figures can be implemented using code and data stored and executed on one or more electronic devices (e.g., an end station, a network element). Such electronic devices store and communicate (internally and/or with other electronic devices over a network) code and data using computer-readable media, such as tangible, non-transitory computer-readable storage media and non-tangible transitory computer-readable communication or transmission media. A few representative examples of tangible, non-transitory computer-readable storage media include, but are not limited to, magnetic disks; optical disks; random access memory (RAM), such as static-RAM (SRAM) and dynamic-RAM (DRAM), read only memory (ROM), such as programmable ROM (PROM), erasable-and-programmable ROM (EPROM), and electrically-erasable-and-programmable ROM (EEPROM), flash memory devices; phase-change memory, and the like. The tangible storage media may include one or more solid or tangible physical materials, such as, for example, a semiconductor material, a phase change material, a magnetic material, etc. Embodiments pertain to an article of manufacture that includes a tangible non-transitory computer-readable storage media storing a sequence of instructions that if executed by a machine (e.g., a network element, switch, router, end station, host, computer system, or electronic device having at least one microprocessor) causes or results in the machine performing one or more operations or methods disclosed herein. A few representative examples of non-tangible transitory computer-readable transmission media include, but are not limited to, electrical, optical, acoustical or other form of propagated signals—such as carrier waves, infrared signals, and digital signals. In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device.

What is claimed is:

1. A method, which is performed in one or more network elements that are in communication between clients that transmit packets and servers, of distributing the packets among the servers which are to process the packets, while providing stickiness of flows of the packets to servers assigned to process the packets of the flows, the method comprising the steps of:
    receiving a first packet of an existing flow for which at least a second packet has already been received, at a static first level packet distribution module;
    statically selecting a group of servers, from among a plurality of groups of the servers, for the first packet of the flow with the static first level packet distribution module, wherein statically selecting the group of servers does not involve using state that assigns the first packet of the flow to the selected group of servers;
    distributing the first packet of the flow to a distributed stateful second level packet distribution system, wherein the distributed stateful second level packet distribution system is implemented on hardware that is distinct from hardware used to implement the static first level packet distribution module;
    statefully selecting a server of the selected group of servers that is to process the first packet of the flow with the distributed stateful second level packet distribution system by accessing state that assigns processing of packets of the flow to the selected server; and
    distributing the first packet of the flow to the selected server.

2. The method of claim 1, wherein the distributed stateful second level packet distribution system is implemented on hardware that includes hardware used to implement the selected group of servers.

3. The method of claim 1, wherein the step of distributing the first packet of the flow to the distributed stateful second level packet distribution system comprises a step of distributing the first packet of the flow to each of a plurality of distributed stateful second level packet distribution modules that each correspond to a different server of the selected group of servers.

4. The method of claim 3, wherein each of the distributed stateful second level packet distribution modules performs the steps of:
    determining that the first packet is not for a new flow by examining a header of the first packet;
    determining whether a flow identifier corresponding to the flow for the first packet is included in a flow table of the distributed stateful second level packet distribution module that is making the determination, wherein the flow table assigns flow identifiers to the server that corresponds to the distributed stateful second level packet distribution module that is making the determination; and
    one of: (1) causing the first packet to be dropped if the flow identifier is not included in the flow table; and (2) causing the first packet to be accepted for processing by the corresponding server if the flow identifier is included in the flow table.

5. The method of claim 4, wherein each of the distributed stateful second level packet distribution modules performs the steps of:
    receiving a third packet;
    determining that the third packet is for a new flow by examining a header of the third packet;
    selecting a server to process the third packet with a packet distribution algorithm, wherein the packet distribution algorithm is operable to select the server consistently with packet distribution algorithms of other distributed stateful second level packet distribution modules for the selected group;
    determining whether the server selected to process the third packet corresponds to the distributed stateful second level packet distribution module that selected the server; and
    one of (1) causing the third packet to be dropped if the selected server does not correspond to the distributed stateful second level packet distribution module that selected the server; and (2) recording a new flow identifier in a flow table of the packet distribution module that selected the server and causing the third packet to be accepted for processing by the selected server if the selected server does correspond to the distributed stateful second level packet distribution module that selected the server.

6. The method of claim 3, wherein each of the distributed stateful second level packet distribution modules performs the steps of:
    determining whether a flow identifier corresponding to the flow for the first packet is included in a flow table of the distributed stateful second level packet distribution module, wherein the flow table assigns flow identifiers to the server that corresponds to the distributed stateful second level packet distribution module; and
    one of: (1) causing the first packet to be accepted for processing by the corresponding server if the flow identifier is included in the flow table; and (2) causing the first packet to be dropped if the flow identifier is not included in the flow table and the flow identifier is included in an exists-on-others flow table of the distributed stateful second level packet distribution module, wherein the exists-on-others flow table lists flow identifiers assigned to servers of the group other than the server corresponding to the distributed stateful second level packet distribution module.

7. The method of claim 1, wherein the distributed stateful second level packet distribution system includes a plurality of distributed stateful second level packet distribution modules that each correspond to a different server of the selected group of servers, and wherein a distributed stateful second level packet distribution module performs the steps of:
sending a message to other distributed stateful second level packet distribution modules that correspond to the servers of the selected group, wherein the message indicates a state and a load of a server corresponding to the distributed stateful second level packet distribution module;
receiving messages from the other distributed stateful second level packet distribution modules, wherein the received messages indicate states and loads of the servers corresponding to the other distributed stateful second level packet distribution modules; and
adjusting a packet distribution algorithm used by the distributed stateful second level packet distribution module based on the states and loads indicated in the received messages.

8. The method of claim 1, wherein the distributed stateful second level packet distribution system includes at least one distributed stateful second level packet distribution module corresponding to the selected group of servers and at least one distributed stateful second level packet distribution module corresponding to a second group of servers, and wherein the method further comprises the steps of:
receiving a message at the at least one distributed stateful second level packet distribution module corresponding to the selected group of servers from the at least one distributed stateful second level packet distribution module corresponding to a second group of servers, wherein the received message indicates at least one load associated with the second group of servers; and
re-assigning a server of the second group to the selected group based at least in part on the at least one load indicted in the received message and at least one load associated with the selected group of servers.

9. The method of claim 1, wherein the method is performed in a single network element having a plurality of line cards and a plurality of cards selected from control cards, service cards, and resource cards, wherein hardware used to implement the static first level packet distribution module comprises hardware of the line cards, and wherein hardware across which the distributed stateful second level packet distribution system is distributed comprises hardware of the cards selected from the control cards, the service cards, and the resource cards.

10. The method of claim 1, further comprising the steps of:
receiving a third packet of a second flow at the static first level packet distribution module, wherein the second flow is a larger volume flow;
statefully selecting a server for the third packet of the second flow with the static first level packet distribution module, wherein statefully selecting the server for the third packet includes using state that assigns larger volume flows to the servers; and
distributing the third packet of the second flow to the selected server.

11. The method of claim 1, wherein each of the plurality of groups of servers form a different virtual local area network (VLAN).

12. The method of claim 1, wherein statefully selecting the server of the selected group of servers that is to process the first packet of the flow comprises selecting the server to balance loads on the servers of the selected group, wherein statically selecting the group of servers comprises performing a hash function with information from the first packet to statically select the group of servers, wherein each of the servers of the selected group comprises one of a different server blade, a different control card, a different service card, a different processor, and a different processor core.

13. The method of claim 1, further adding a server to the selected group of servers, wherein adding the server to the selected group does not upset stickiness of existing flows to the servers of the selected group.

14. The method of claim 1, further comprising, after processing the first packet with the selected server:
statically selecting a second group of servers from among the plurality of groups of the servers; and
distributing the first packet to the second group of servers.

15. A multi-level packet distribution system, the multi-level packet distribution system configured to be deployed on one or more network elements in a network between clients that transmit packets and servers, of distributing the packets among the servers, while providing stickiness of flows of the packets to the servers, the multi-level packet distribution system comprising:
a static first level packet distribution module configured to receive a first packet of an existing flow for which at least a second packet has already been received, the static first level packet distribution module operable to statically select a group of servers, from among a plurality of groups of the servers, for the first packet of the flow, wherein statically selecting the group of servers does not involve using state that assigns the first packet of the flow to the selected group of servers; and
a distributed stateful second level packet distribution system in communication with the static first level packet distribution module, wherein the distributed stateful second level packet distribution system includes a plurality of distributed stateful second level packet distribution modules, wherein the distributed stateful second level packet distribution system is implemented on hardware that is distinct from hardware used to implement the static first level packet distribution module, the distributed stateful second level packet distribution system operable to statefully select a server of the selected group of servers that is to process the first packet of the flow, wherein statefully selecting the server involves using state that assigns the flow to the selected server, the distributed stateful second level packet distribution system operable to distribute the first packet to the selected server.

16. The multi-level packet distribution system of claim 15, wherein the distributed stateful second level packet distribution system is implemented on hardware that includes hardware used to implement the selected group of servers.

17. The multi-level packet distribution system of claim 15, wherein the multi-level packet distribution system is configured to be deployed in a single network element having a plurality of line cards and a plurality of cards selected from control cards, service cards, and resource cards, wherein hardware used to implement the static first level packet distribution module comprises hardware of the line cards, and wherein the distributed stateful second level packet distribution system is distributed across hardware of the cards selected from the control cards, the service cards, and the resource cards.

18. The multi-level packet distribution system of claim 15, wherein the plurality of distributed stateful second level packet distribution modules comprise a plurality of distributed stateful second level packet distribution modules that each correspond to a different server of the selected group of servers.

19. The multi-level packet distribution system of claim 18, wherein a distributed stateful second level packet distribution module corresponding to a server comprises:
- a packet examination module operable to determine that the first packet is not for a new flow by examining a header of the first packet;
- a flow table that assigns flow identifiers to the server corresponding to the distributed stateful second level packet distribution module;
- a flow table checker module operable to determine whether a flow identifier corresponding to the flow for the first packet is included in the flow table; and
- a determination module operable to one of: (1) cause the first packet to be dropped if the flow identifier is not included in the flow table; and (2) cause the first packet to be accepted for processing by the corresponding server if the flow identifier is included in the flow table.

20. The multi-level packet distribution system of claim 19, wherein the packet examination module is operable to receive a third packet and operable to determine that the third packet is for a new flow by examining a header of the third packet, and further comprising:
- a packet distribution algorithm operable to select a server to process the third packet, wherein the packet distribution algorithm is operable to select the server consistently with packet distribution algorithms of other distributed stateful second level packet distribution modules for the selected group;
- a determination module operable to determine whether the server selected to process the third packet is the same as the server corresponding to the distributed stateful second level packet distribution module; and
- a determination module operable to one of (1) cause the third packet to be dropped if the selected server is not the same as the server corresponding to the distributed stateful second level packet distribution module; and (2) record a new flow identifier in a flow table of the packet distribution module and cause the third packet to be accepted for processing by the selected server if the selected server is the same as the server corresponding to the distributed stateful second level packet distribution module.

21. The multi-level packet distribution system of claim 18, wherein a distributed stateful second level packet distribution module corresponding to a server comprises:
- a flow table that assigns flow identifiers to the server that corresponds to the distributed stateful second level packet distribution module;
- a flow table checker module operable to determine whether a flow identifier corresponding to the flow for the first packet is included in the flow table; and
- an exists-on-others flow table, wherein the exists-on-others flow table includes flow identifiers assigned to servers of the selected group other than the server corresponding to the distributed stateful second level packet distribution module; and
- a determination module operable to one of: (1) cause the first packet to be accepted for processing by the corresponding server if the flow identifier is included in the flow table; and (2) cause the first packet to be dropped if the flow identifier is not included in the flow table and the flow identifier is included in the exists-on-others flow table.

22. The multi-level packet distribution system of claim 15, wherein the distributed stateful second level packet distribution system includes a plurality of distributed stateful second level packet distribution modules that each correspond to a different server of the selected group of servers, and wherein a distributed stateful second level packet distribution module corresponding to a server comprises:
- a message send module operable to send a message to other distributed stateful second level packet distribution modules of the selected group, wherein the message indicates a state and a load of the corresponding server;
- a message receive module operable to receive messages from the other distributed stateful second level packet distribution modules, wherein the received messages indicate states and loads of the corresponding servers; and
- a packet distribution algorithm adjustment module operable to adjust a packet distribution algorithm used by the distributed stateful second level packet distribution module based on the states and loads indicated in the received messages.

23. The multi-level packet distribution system of claim 15, wherein the distributed stateful second level packet distribution system includes at least one distributed stateful second level packet distribution module corresponding to the selected group of servers and at least one distributed stateful second level packet distribution module corresponding to a second group of servers, and wherein the at least one distributed stateful second level packet distribution module corresponding to the selected group of servers comprises:
- a message receive module operable to receive a message at the at least one distributed stateful second level packet distribution module corresponding to the selected group of servers from the at least one distributed stateful second level packet distribution module corresponding to a second group of servers, wherein the received message indicates at least one load associated with the second group of servers; and
- a server group re-assignment module operable to re-assign a server of the second group to the selected group based at least in part on the at least one load indicted in the received message and at least one load associated with the selected group of servers.

* * * * *

UNITED STATES PATENT AND TRADEMARK OFFICE
CERTIFICATE OF CORRECTION

PATENT NO. : 8,825,867 B2  
APPLICATION NO. : 13/464608  
DATED : September 2, 2014  
INVENTOR(S) : Arisoylu et al.

Page 1 of 1

It is certified that error appears in the above-identified patent and that said Letters Patent is hereby corrected as shown below:

On the Title Page, in the Figure, for Tag "533", in Line 1, delete "DISTRIBUTED" and insert -- DISTRIBUTED, --, therefor.

In the Drawings

In Fig. 5, Sheet 5 of 13, for Tag "533", in Line 1, delete "DISTRIBUTED" and insert -- DISTRIBUTED, --, therefor.

In the Specification

In Column 11, Line 31, delete "IDS," and insert -- IDs, --, therefor.

In Column 17, Line 42, delete "1008-1" and insert -- 1008-3 --, therefor.

In the Claims

In Column 26, Line 46, in Claim 5, delete "one of" and insert -- one of: --, therefor.

In Column 29, Line 44, in Claim 20, delete "one of" and insert -- one of: --, therefor.

Signed and Sealed this  
Third Day of March, 2015

Michelle K. Lee  
*Deputy Director of the United States Patent and Trademark Office*